(12) United States Patent
Enga

(10) Patent No.: US 12,141,167 B2
(45) Date of Patent: Nov. 12, 2024

(54) EXECUTING HIERARCHICAL DATA SPACE OPERATIONS

(71) Applicant: Craxel, Inc., Chantilly, VA (US)

(72) Inventor: David Enga, Chantilly, VA (US)

(73) Assignee: Craxel, Inc., Chantilly, VA (US)

(*) Notice: Subject to any disclaimer, the term of this patent is extended or adjusted under 35 U.S.C. 154(b) by 0 days.

(21) Appl. No.: 17/808,973

(22) Filed: Jun. 24, 2022

(65) Prior Publication Data

US 2023/0229673 A1 Jul. 20, 2023

Related U.S. Application Data

(60) Provisional application No. 63/266,886, filed on Jan. 18, 2022.

(51) Int. Cl.
*G06F 16/28* (2019.01)
*G06F 16/22* (2019.01)
*G06F 21/60* (2013.01)

(52) U.S. Cl.
CPC .......... *G06F 16/282* (2019.01); *G06F 16/221* (2019.01); *G06F 16/288* (2019.01); *G06F 21/602* (2013.01)

(58) Field of Classification Search
CPC .... G06F 16/282; G06F 16/221; G06F 16/288; G06F 21/602; G06F 16/28; G06F 16/22; G06F 16/284; G06F 21/6227; G06F 21/60; G06F 16/13; G06F 3/06
See application file for complete search history.

(56) References Cited

U.S. PATENT DOCUMENTS

| | | | |
|---|---|---|---|
| 5,701,467 A | 12/1997 | Freeston | |
| 5,724,512 A | 3/1998 | Winterbottom | |
| 6,223,182 B1 | 4/2001 | Agarwal | |
| 6,252,547 B1 | 6/2001 | Perry et al. | |
| 6,401,029 B1 | 6/2002 | Kubota et al. | |
| 6,542,819 B1 | 4/2003 | Kovacs et al. | |

(Continued)

FOREIGN PATENT DOCUMENTS

WO WO 0203237 A1 1/2002

OTHER PUBLICATIONS

Liu et al. "Research and implementation of mass remote sensing image data storage and management." 2010 IEEE International Conference on Progress in Informatics and Computing. vol. 1. IEEE, 2010. Dec. 12, 2010 (Dec. 12, 2010) cited in PCT/US2022/073171, retrieved on Aug. 13, 2022 from <https:Bieeexplore.ieee.org/abstract/document/5687478>, 4 pages.

(Continued)

*Primary Examiner* — Hosain T Alam
*Assistant Examiner* — Cecile H Vo
(74) *Attorney, Agent, or Firm* — CM Law PLLC; Scott C. Sample

(57) ABSTRACT

Methods and apparatus for executing a data operation are described herein. The methods and systems may include determining at least one subdivision of at least one logical hierarchical data space. The at least one logical hierarchical data space may have a plurality of subdivisions. The method may further include determining at least one file corresponding to the at least one subdivision of the at least one logical hierarchical data space. The method may further include reading at least one tuple from the at least one file.

62 Claims, 17 Drawing Sheets

(56) References Cited

U.S. PATENT DOCUMENTS

| | | |
|---|---|---|
| 6,954,697 B1 | 10/2005 | Smith |
| 7,382,244 B1 | 6/2008 | Donovan et al. |
| 7,454,435 B2 | 11/2008 | Friedman et al. |
| 7,720,436 B2 | 5/2010 | Hamynen et al. |
| 10,416,919 B1* | 9/2019 | Cai .................... G06F 3/0643 |
| 2001/0045965 A1 | 11/2001 | Orbanes et al. |
| 2002/0055924 A1 | 5/2002 | Liming |
| 2002/0091696 A1 | 7/2002 | Craft et al. |
| 2002/0115453 A1 | 8/2002 | Poulin et al. |
| 2002/0160766 A1 | 10/2002 | Portman et al. |
| 2002/0161627 A1 | 10/2002 | Gailey et al. |
| 2002/0161647 A1 | 10/2002 | Gailey et al. |
| 2002/0184200 A1 | 12/2002 | Ueda et al. |
| 2003/0036848 A1 | 2/2003 | Sheha et al. |
| 2003/0220835 A1 | 11/2003 | Barnes, Jr. |
| 2004/0019581 A1 | 1/2004 | Davis et al. |
| 2004/0230467 A9 | 11/2004 | Gailey et al. |
| 2005/0015307 A1 | 1/2005 | Simpson et al. |
| 2005/0030194 A1 | 2/2005 | Cheng et al. |
| 2006/0149774 A1 | 7/2006 | Egnor |
| 2006/0188327 A1 | 8/2006 | Moon |
| 2006/0206507 A1 | 9/2006 | Dahbour |
| 2006/0265197 A1 | 11/2006 | Peterson |
| 2007/0016565 A1 | 1/2007 | Evans et al. |
| 2007/0041336 A1 | 2/2007 | Wan et al. |
| 2007/0112808 A1 | 5/2007 | Howard et al. |
| 2007/0234202 A1 | 10/2007 | Lyness |
| 2007/0258623 A1 | 11/2007 | McGrath et al. |
| 2008/0086464 A1 | 4/2008 | Enga |
| 2008/0126403 A1 | 5/2008 | Moon |
| 2008/0183730 A1 | 7/2008 | Enga |
| 2009/0150355 A1 | 6/2009 | Garfinkle et al. |
| 2009/0164459 A1 | 6/2009 | Jennings et al. |
| 2009/0192903 A1 | 7/2009 | Weiss et al. |
| 2009/0307067 A1 | 12/2009 | Obermeyer |
| 2010/0017261 A1 | 1/2010 | Evans et al. |
| 2010/0042519 A1 | 2/2010 | Dingler et al. |
| 2012/0124289 A1 | 5/2012 | Kavuri et al. |
| 2013/0042052 A1 | 2/2013 | Colgrove et al. |
| 2013/0198237 A1* | 8/2013 | Serban .............. G06F 16/24534 707/792 |
| 2016/0321375 A1 | 11/2016 | Liu et al. |
| 2017/0250798 A1* | 8/2017 | Enga .................... H04L 9/0643 |
| 2021/0152328 A1* | 5/2021 | Enga ....................... H04L 9/14 |
| 2023/0008502 A1* | 1/2023 | Enga ................ G06F 16/24552 |

OTHER PUBLICATIONS

International Search Report and Written Opinion in PCT/US2022/073171, dated Sep. 16, 2022, 8 pages.

Szalay et al., "Indexing the Sphere with the Hierarchical Triangular Mesh," Technical Report MSR-TR-2005-123, Microsoft Research, Redmond WA, Aug. 2005, 23 pages, in U.S. Appl. No. 11/905,810.

Graybox "Storing Hierarchical Data in a Database." Sep. 10, 2014, retrieved by ISA/US on Aug. 14, 2022 (Aug. 14, 2022) from <www.graybox.co/knowledge/blog/storing-hierarchical-data-in-a-databases.

Nadel. "Creating A Composite Index Using Ancestral Keys In A Hierarchical Database Table Design." Jun. 24, 2019, retrieved by the ISA/US in PCT/US2022/073170 on Aug. 12, 2022 from <www.bennadel.com/blog/3643-creating-a-composite-index-using-ancestral-keys-in-a-hierarchical-database-table-design.hhn>.

CRAX107WO1_ International Search Report and Written Opinion dated Sep. 22, 2022 cited in PCT/US2022/173168, 6 pages.

CRAX108WO1_International Search Report and Written Opinion dated Sep. 16, 2022 cited in PCT/US2022/073169, 9 pages.

CRAX110WO1_International Search Report and Written Opinion dated Sep. 16, 2022 cited in PCT/US2022/073171, 8 pages.

U.S. Appl. No. 17/808,961 entitled Transforming Relational Statements Into Hierarchical Data Space Operations, filed Jun. 24, 2022 (Jun. 24, 2022) to David Enga (107).

U.S. Appl. No. 17/808,966 entitled Organizing Information Using Hierarchical Data Spaces, filed Jun. 24, 2022 (Jun. 24, 2022) to David Enga (108).

U.S. Appl. No. 17/808,968 entitled Composite Operations Using Multiple Hierarchical Data Spaces, filed Jun. 24, 2022 (Jun. 24, 2022) to David Enga (109).

* cited by examiner

100

| Column | Constraints | Data Type | Logical Data Space 1 | Logical Data Space 2 |
|---|---|---|---|---|
| Name | PK | Varchar(64) | String Space 1 | String Space 2 |
| Birth Date | None | Datetime | DateTime Space 1 | DateTime Space 2 |
| Age | None | Integer | Int Space 1 (0,150) | Int Space 2 (0,150) |
| Salary | None | Numeric | Numeric Space 1 | Numeric Space 2 |
| Location | Unique | Geospatial | Geospatial Space 1 | Geospatial Space 2 |

| Physical Hierarchical Data Space | Key | Logical Hierarchical Data Space 1 | Logical Hierarchical Data Space 2 |
|---|---|---|---|
| A | Name | String Space 1 | String Space 2 |
| B | Area | Geospatial Space 1 | Geospatial Space 2 |

FIG. 1B

334
| A | B |
|---|---|
| α {0-11} | 1 {0-00} |
| β {0-00-10-01} | 1 {0-00} |
| β {0-00-10-01} | 2 {0-01-00} |
336
| A | B |
|---|---|
| α {0-11} | 3 {0-01-11-00} |
| β {0-00-10-01} | 4 {0-01-11-01} |
FIG. 3C
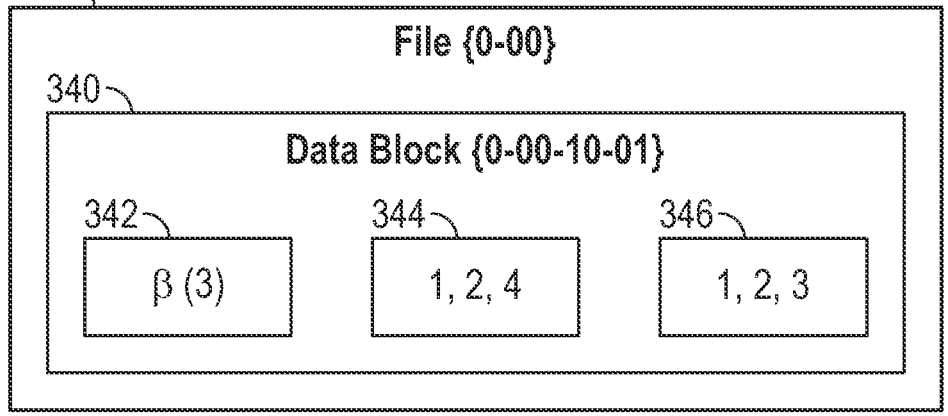
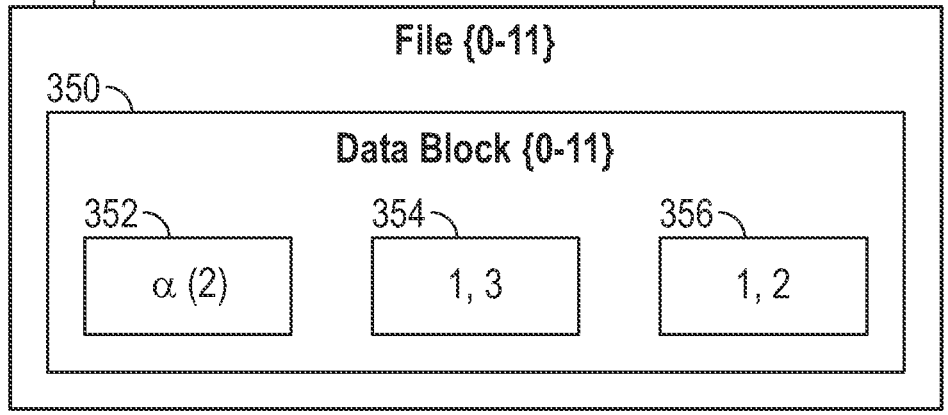
FIG. 3D

EXECUTING HIERARCHICAL DATA SPACE OPERATIONS

PRIORITY

This application claims the benefit of U.S. Provisional Patent Application No. 63/266,886, filed on Jan. 18, 2022, and entitled "EXECUTING HIERARCHICAL DATA SPACE OPERATIONS," which application is incorporated herein by reference.

BACKGROUND OF THE INVENTION

Field of the Disclosure

The present disclosure relates to information security, and more particularly to a system for executing a data operation using hierarchical data spaces.

Background

Relational data management systems were designed and implemented to operate in the relational data model using either row or columnar approaches for organizing relations by the value of specified attributes, also known as columns. These systems organize and retrieve information by comparing or sorting values. Column-oriented approaches store the values of each column separately. When these columns are unsorted, the system must scan the entire column of values to perform an operation. Relational and non-relational data management systems perform data operations by value for the attributes relevant to the operation.

SUMMARY OF THE INVENTION

Accordingly, embodiments of the invention are directed to a data management system and method for executing a data operation using one or more hierarchical data spaces that substantially obviates one or more of the problems due to limitations and disadvantages of the related art.

In one aspect, a system for executing a data operation includes a memory that stores instructions, and a processor that executes the instructions to perform operations. The operations may include determining at least one subdivision of at least one logical hierarchical data space. The at least one logical hierarchical data space may have a plurality of subdivisions. The operations may further include determining at least one file corresponding to the at least one subdivision of the at least one logical hierarchical data space. The operations may further include reading at least one tuple from the at least one file.

In another aspect, a method for executing a data operation may include determining at least one subdivision of the at least one logical hierarchical data space. The at least one logical hierarchical data space may have a plurality of subdivisions. The method may further include determining at least one file corresponding to the at least one subdivision of the at least one logical hierarchical data space. The method may further include reading at least one tuple from the at least one file.

In still another aspect, a computer readable device, which when loaded and executed by a processor, causes the processor to perform operations for executing a data operation including determining at least one subdivision of the at least one logical hierarchical data space. The at least one logical hierarchical data space may have a plurality of subdivisions. The operations may further include determining at least one file corresponding to the at least one subdivision of the at least one logical hierarchical data space. The operations may further include reading at least one tuple from the at least one file.

BRIEF DESCRIPTION OF THE DRAWINGS

The accompanying drawing, which is included to provide a further understanding of embodiments of the invention and are incorporated in and constitute a part of this specification, illustrate embodiments of the invention and together with the description serve to explain the principles of embodiments of the invention.

FIG. 1A shows a schema with multiple, different logical hierarchical data spaces associated with the columns of a relation according to various embodiments;

FIG. 1B shows the physical hierarchical data spaces for a relation and multiple, different logical hierarchical data spaces associated with each of those physical hierarchical data spaces according to various embodiments;

FIG. 3C shows two relations with values and hierarchical path identifiers for two columns according to various embodiments;

FIG. 3D shows tuples stored in multiple files, data blocks, and sub data blocks corresponding to the subdivisions of a hierarchical data space according to various embodiments;

DETAILED DESCRIPTION OF THE PREFERRED EMBODIMENTS

Figure 1C:
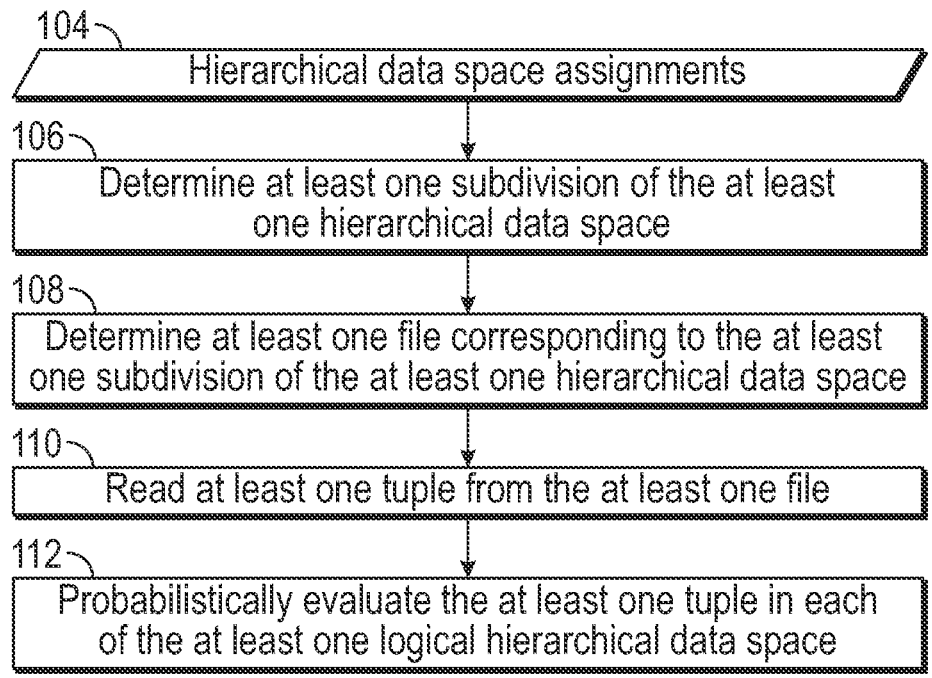
FIG. 1C shows a method for executing a data operation using at least one logical hierarchical data space according to various embodiments.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete and will fully convey the concept of the invention to those skilled in the art.

Data, data value, or value is any sequence of one or more symbols. A data value or value may have an associated data type. A tuple is a sequence of one or more data values. A tuple may be an ordered sequence of one or more data values. A tuple may be an unordered sequence of one or more data values. A tuple is also a data value. As such, tuples may contain other tuples. Various methods of organizing the data values in a tuple are contemplated including, but not limited to, a sequence of one or more data values, ordered sequences of data values, unordered sequences of data values, individual key values, key/value pairs, records, elements, a data structure, a collection such as a list or map, structures, unions, self-describing records, an XML document or element, a JSON key/value pair, or a JSON list. A relation, or table, is a set of tuples where the value of each attribute, or column, of the tuple is a member of a data domain. Data values are vulnerable when they are not encrypted or when they are encrypted and co-located with the encryption keys that can decrypt them.

A file is a collection of data stored on a computer storage device. The computer storage device may be volatile or non-volatile. There are various computer storage devices including, but not limited to, random access memory (RAM), read-only memory (ROM), magnetic storage devices, flash memory devices, optical storage devices, cloud storage services, virtual storage. A file is typically accessible to a computer program executing on a computing device as a one-dimensional array of contiguous bytes. Although bytes are typically used, different data types may be used, such as a one-dimensional array of contiguous 32-bit or 64-bit words.

The one-dimensional array of contiguous bytes may be stored in a computer storage device as non-contiguous bytes. The computer storage device, file system, operating system, or other software may translate the non-contiguous bytes in storage so that a computer program executing on a computing device may access it as a one-dimensional array of contiguous bytes. A file may have an associated identifier so that the collection of data can be found in the computer storage device using the identifier. This identifier may be a pointer to a memory location of the computer storage device or a name that the computer storage device, file system, operating system, or other software uses to find the underlying bytes. The identifier may also include a path. A file may have associated metadata. There are many ways to organize information by file identifier and path.

A data block is a contiguous subset of bytes in a file or a message. A data block may be fixed or variable length. Since a file may be stored or a message transmitted as non-contiguous bytes, a data block may also be stored or transmitted as non-contiguous bytes and translated to appear as contiguous bytes. For example, a file system may store a file in a set of non-contiguous fixed sized blocks and then translate the contents so that the data in the file can be accessed by its position in a contiguous set of bytes. In another example, a message may be split into a set of packets in the underlying communications network, but the sender provides the data for the message as a contiguous set of bytes and the receiver translates the message back into a contiguous set of bytes.

A logical hierarchical data space (LHDS) is a space that is divided into a plurality of subdivisions. Each subdivision is recursively subdivided and so on until a maximum depth is reached. A parent subdivision is any subdivision that is part of another subdivision's path to the root subdivision. A subdivision is a child of another subdivision if that other subdivision is a parent subdivision. A child subdivision is an immediate child subdivision of a parent subdivision if the parent subdivision has depth that is one less than the child subdivision. Together, immediate child subdivisions must fill all the space of their parent subdivision. Immediate child subdivisions of a subdivision may not overlap each other. Child subdivisions may not extend beyond their parent subdivision's space. These properties are required.

Data values are projected onto the space so that the path through the subdivisions holding the value can be identified. This path is called a hierarchical path identifier (HPId). An HPId identifies a path to a subdivision in a hierarchical data space. An HPId must explicitly specify the depth of the subdivision being identified or implicitly specify the depth based on the length of the path specified by the hierarchical path identifier. The projection of a data value must be consistent so that the same data value always projects to the same subdivision at the same depth. The projection of a data value does not depend on previous data values projected onto the space or stored in the space. The boundaries of each subdivision are fixed. Because a hierarchical data space preserves the hierarchy of its subdivisions, a HPId identifies a subdivision and any parent subdivisions to the root of the data space. Hierarchical path identifiers and data values may be encrypted in ways that minimize the information an intruder can learn about the data being stored. Hierarchical path identifiers, even when encrypted, must preserve the hierarchy of its subdivisions for operations using the hierarchical data space to function properly.

A hierarchical data space block is a data block that is associated with at least one subdivision of at least one logical hierarchical data space. A hierarchical data space block may be associated with subdivisions from multiple logical hierarchical data spaces. A hierarchical data space block may include child data blocks. It may also include data or metadata.

An LHDS is described by a hierarchical data space definition. In one embodiment, the hierarchical data space definition comprises the function and parameters that map a data value for a specific data type to a subdivision of a hierarchical data space. There are many different mapping functions, combinations of functions, and parameters that may be used. The parameters of the hierarchical data space definition modify how the function maps a data value to the subdivisions of the hierarchical data space. For example, the domain of 32-bit integers is −2,147,483,648 to 2,147,483,648, but the range of integer values expected in a column such as the Age column in schema 100 may be 0 to 125. Mapping the smaller range to the entire space may make queries against the hierarchical data space more selective. Once generated, hierarchical path identifiers may be used independently in hierarchical data spaces without the data value and the hierarchical data space definition used to generate them. This allows the execution of probabilistic operations using hierarchical data spaces on untrusted computers without exposing sensitive data values or the hierarchical data space definition used to project data values into the hierarchical data space.

An HPId can be used to find the subdivision in the hierarchical data space as well as the path through a hierarchical data structure representing the hierarchical data space. As used herein, a "physical hierarchical data space" refers to an instantiation of a structure that maintains the hierarchical relationship between the subdivisions of one or more logical hierarchical data spaces.

By preserving hierarchy, hierarchical data spaces can efficiently support probabilistic bounding, range, multi-dimensional, intersection, prefix, exact match queries, and other operations using hierarchical path identifiers without comparing any values. Hierarchical data spaces support range query by preserving hierarchy instead of preserving order. Hierarchical data spaces have no inherent notion of order. This may reduce inference data security risk.

An encrypted HPId is a HPId that has been encrypted by applying secret permutations to each subdivision's set of immediate child subdivisions. This reduces the probability that an attacker without the secret key can determine the original subdivision of space each portion of the hierarchical path points to. For those data types with a notion of order, these secret permutations can eliminate ordering. This may also reduce inference risk. The hierarchy of the subdivisions must be preserved throughout the encryption process so that encrypted probabilistic operations can still function properly.

Encrypted hierarchical path identifiers allow operations to be split between initial probabilistic execution using encrypted hierarchical path identifiers performed on untrusted computers and execution by value performed on trusted computers. The amount of data to be decrypted and the amount of execution by value is related to how effective the probabilistic execution is on the untrusted computers.

The attributes of each tuple may also be associated with one or more different hierarchical data spaces. An operation that wishes to act on a specific attribute of the tuple can probabilistically evaluate the hierarchical path identifiers for that attribute prior to or without evaluating the value of the attribute itself. This probabilistic evaluation using different hierarchical data spaces is essentially an intersection or AND operation on the results of evaluating an operation against a tuple in each hierarchical data space. If the operation's HPId for a given hierarchical data space does not match the tuple's HPId for that hierarchical data space, then the tuple does not match. If they all match, then the tuple may be a match for the operation. In this context, match does not necessarily mean that the hierarchical path identifiers identify the exact same subdivision. For many operations, they may match if one HPId identifies a parent subdivision of the subdivision identified by the other HPId or vice versa.

To use hierarchical data spaces to execute operations, logical data spaces need to be chosen or specified. The operations may also need information about the data being stored.

A relational schema defines the structure of a table and a set of constraints defined for the columns in the table. FIG. 1A shows a schema 100 that has five named columns. They are Name, BirthDate, Age, Salary, and Location. Name is from the domain of variable length characters (varchar). BirthDate is from the domain of datetime. Age is from the domain of integers. Salary is from the domain of real numbers (numeric). Location is from the geospatial domain. The constraint column allows various constraints to be set for a given column. For example, a primary key constraint indicates that the column is part of the primary key for the default physical hierarchical data space. The constraints attribute allows a variety of constraints to be specified, such as whether the column is part of the primary key for the default physical hierarchical data space.

Schema 100 also shows a schema for a table and the assignment of two logical hierarchical data spaces to each column. More than one LHDS definition may be associated with each column. Using multiple different LHDS definitions can improve the selectivity of a query or operation that uses hierarchical path identifiers to find probabilistic matches. Tuples that have a valid HPId for an operation's HPId for the same hierarchical data space are a candidate match. The probability they are a match increases with each additional hierarchical data space where the operation matches the candidate. If the candidate value's HPId is not valid for the operation's corresponding hierarchical path identifier, then the probability it is a match is zero. The hierarchical data spaces must have different subdivisions, or the use of multiple hierarchical data spaces will not increase the selectivity. Ensuring each hierarchical data space has different subdivisions may be accomplished by specifying different parameters or by using different hierarchical space definitions that inherently subdivide space differently.

Schema 100 defines the columns for a table. It specifies the column name, constraints, data type, and logical data spaces for each column. In at least one embodiment, three different logical hierarchical data spaces are associated with each column. Although schema 100 describes attributes for a relation, schema 100 could also have described the attributes found in other non-relational forms such as a JSON document. In addition to associating logical hierarchical data spaces to a column or attribute, other useful information can be specified in the schema.

The data type attribute specifies the domain for the column and optionally the length or the range of the data. The constraint column allows various constraints to be set for a given column. For example, a primary key constraint indicates that the column is part of the primary key for the default physical hierarchical data space.

FIG. 1B shows the physical hierarchical data spaces for the relation defined by schema 100. The data for the relation can be stored in physical hierarchical data spaces using hierarchical path identifiers instead of in data structures that order records by value. A first LHDS and a second LHDS are specified for each physical hierarchical data space. Although a first and a second hierarchical logical data space are shown, additional different logical hierarchical data spaces can be used. They are described as a first and second to denote that the logical hierarchical data spaces are different, in that they use a different method of subdividing space, have different parameters that change how they subdivide space, or use a different function to map a data value to subdivision. The attributes of a schema comprising the physical hierarchical data spaces, columns, and logical hierarchical data spaces can be used to determine how to store the tuples in a hierarchical data space.

FIG. 1B could also describe the physical hierarchical data spaces for non-relational data such as JSON, image or video metadata, or XML and the attributes to use for extracting the values to generate hierarchical path identifiers.

FIG. 1C shows a method for executing a data operation using at least one logical hierarchical data space. The method is applicable for data operations including, but not limited to, mutations, deletes, queries, storage/retrieval, mathematical operations, execution of arbitrary algorithms or code, relational algebra, selection, projection, union, join, intersection, difference, relational calculus, graph operations, linear algebra, transformations, columnar operations, classification algorithms, machine learning algorithms, or statistical operators.

Hierarchical data space assignments 104 may specify the logical hierarchical data spaces for each attribute, set of attributes, or the associated physical hierarchical data spaces like those described in FIG. 1B.

The use of various numbers of different logical hierarchical data spaces is contemplated including, but not limited to one, two, or three. The preferred number of different logical hierarchical data spaces is three. Various ways of determining the at least one LHDS are contemplated including, but not limited to, specified in an operation, specified in a parameter, specified in the input data, specified in the schema for the table being operated upon, specified in hierarchical data space assignments for the table being operated upon, derived from the input data, hard coded, read from a property file, looked up in a map based on a value in the input data, extracted from a statement, selected from a set of hierarchical data spaces based on the attributed present in a statement or operation, selected using information in a schema based on a value or values extracted from a statement or operation, or selected by choosing a physical hierarchical data space and using its associated logical hierarchical data spaces.

For example, FIG. 1B shows two physical data spaces. Physical hierarchical data space A uses the "Name" field as its key attribute. This allows for information to be found efficiently by "Name" as the value for the "Name" attribute will be mapped to at least one subdivision of at least one LHDS used by physical hierarchical data space A. Physical hierarchical data space B uses the "Location" attribute as its key attribute. This allows for information to be found efficiently by "Location". Physical hierarchical data space A and physical hierarchical data space B both have two logical hierarchical data spaces. Step 106 will choose at least one of these logical hierarchical data spaces depending on which physical hierarchical data space the data operation requires. For example, if the data operations need to access a tuple for the relation specified by schema 100, then step 106 can look at the hierarchical data space assignments 104 and choose between the logical data spaces for physical hierarchical data space A and physical hierarchical data space B.

Step 106 determines at least one subdivision of the at least one logical hierarchical data space. Various data operations that require reading tuples may be supported by using different methods of determining the at least one subdivision of the at least one logical hierarchical data space. For example, an exact match query can be performed in a single subdivision of the at least one logical hierarchical data space. A bounding query for point data types can be performed by visiting a specified subdivision and all its child subdivisions. A bounding query for interval data can be performed by visiting a specified subdivision, all its child subdivisions, and its parent subdivisions. A join operation can be performed by traversing an intermediate result set organized in a physical hierarchical data space to determine the at least one subdivision of the at least one logical hierarchical data space. While storing a single tuple only happens in a single subdivision of at least one logical hierarchical data space, many operations that require reading tuples may be supported by varying how the subdivision of the at least one LHDS is determined.

Various embodiments for determining at least one subdivision of the at least one LHDS are contemplated, but not limited to, receiving the at least one subdivision from the at least one operation, determining at least one value and identifying at least one subdivision of the at least one secondary hierarchical data space that corresponds to the at least one value, using one or more hierarchical path identifies that identify the at least one subdivision, using one or more encrypted hierarchical path identifiers that preserves the hierarchy of the at least one secondary hierarchical data space that identify the at least one subdivision of the at least one hierarchical data space, traversing at least one subdivision of the at least one hierarchical data space, starting at a specified subdivision and then traversing its parent subdivisions, coordinated traversal of the subdivisions of the at least one hierarchical data space and the subdivisions of a secondary hierarchical data space, traversing an input data set stored in a physical hierarchical data space, retrieving a value from an input data set and generating an HPId or encrypted HPId that identifies the at least one subdivision, traversing an intermediate result set stored in a physical hierarchical data space, extracting a value from a result set and generating a HPId that identifies the at least one subdivision, retrieving an HPId or encrypted HPId from a result set and using it to identify the at least one subdivision, or deriving an HPId or encrypted HPId from one or more other hierarchical path identifiers and using it to identify the at least one subdivision.

Some methods of determining at least one subdivision of the at least one LHDS generate an HPId using at least one value. Methods of determining at least one value include, but are not limited to, extracting the at least one value from the input of a data operation, extracting the value from a statement, extracting the at least one value from a tuple, extracting the at least one value from a record in a result set, extracting the at least one value from an ordered sequence of data values, extracting the at least one value from an unordered sequence of data values using the attribute as a lookup key, receiving the at least one value as a parameter, retrieving the value from a service, deriving the value from one or more values, reading the at least one value from storage, reading the at least one value from configuration, reading the at least one value from a property file, extracting the value from a result set, looking up the value in a key/value data structure such as a map, reading the at least one value from a database table, extracting the value from a record, or extracting the value from a collection.

One of the ways to determine the at least one subdivision of the at least one LHDS from the value for a given attribute, the same process may be used that is used for generating a hierarchical path identifier. First, at least one attribute that corresponds to the at least one LHDS is chosen. Next, at least one value for the at least one attribute is determined. Finally, at least one subdivision of the at least one LHDS is identified that corresponds to the at least one value.

For instance, an attribute specified as the key attribute for the physical hierarchical data space can be chosen. Multiple attributes can be specified as the key for a physical hierarchical data space. FIG. 1B shows that the "Name" attribute is the key attribute for physical hierarchical data space A and "Location" is the key attribute for physical hierarchical data space B. The at least one LHDS is one of the logical hierarchical data spaces associated with the physical hierarchical data space.

Next, at least one value for the chosen at least one attribute is determined. Methods of determining at least one value for the at least one attribute include, but are not limited to, extracting the at least one value from the input of a data operation, extracting the value from a statement, extracting the at least one value from a tuple, extracting the at least one value from a record in a result set, extracting the at least one value from an ordered sequence of data values, or extracting the at least one value from an unordered sequence of data values using the attribute as a lookup key. For the first or second LHDS for physical hierarchical data space A, the value for the "Name" attribute would be the input value. For the first or second LHDS for physical hierarchical data space B, the value for the "Location" attribute is extracted. Finally, at least one subdivision of the at least one LHDS is identified that corresponds to the at least one value. The subdivision that is identified may be specified using a hierarchical path identifier. During this process, the identity of the subdivision may be encrypted using secret permutations that preserve the hierarchy of the logical hierarchical data space.

Step 108 determines at least one file that corresponds to the at least one subdivision of the at least one hierarchical data space. There may be multiple files that correspond to the same subdivision of the at least one hierarchical data space. If more than one different hierarchical data spaces are chosen, the at least one file will correspond to at least one subdivision of each different logical hierarchical data space. Files that do not have a corresponding subdivision for each of the logical hierarchical data spaces will not be selected. This allows files that cannot hold data applicable for the data operation to be excluded from processing, eliminating the input/output (IO) operations required to open and read the file. The file may also be checked to see if its metadata matches a condition. If its metadata does not match the condition, then it will not be accessed. This allows files to be filtered by criteria such the time interval for the data it holds before any data is accessed.

Various embodiments for determining at least one file that corresponds to the at least one subdivision of the at least one hierarchical data space are contemplated including, but not limited to, extracting the parent subdivision from the file name of one or more candidate files and determining if the parent subdivision matches the at least one subdivision of the at least one logical hierarchical data space; reading the metadata from inside one or more candidate files, extracting the association between the file and the subdivisions it contains, and determining if the subdivisions contained in the file matches the at least one subdivision of the at least one logical hierarchical data space; extracting the association between one or more candidate files and the subdivisions they contain from a separate file, and determining if the subdivisions contained in the file matches the at least one subdivision of the at least one logical hierarchical data space, or querying a registrar by sending the at least one subdivision of the at least one LHDS to the registrar and having it determine which files have corresponding subdivisions. Once the subdivisions contained in a file are determined, it can be determined if any of the subdivisions match the at least one subdivision. The data operation type may be included in the matching process as a subdivision may match some operation types and not others. For example, some operations may only need to access a single subdivision while an operation such as a bounding query may need to access a subdivision and all its children.

The at least one file may be associated with at least one common subdivision for at least one LHDS for the at least one data block. By the file being associated with the deepest common subdivision of all the subdivisions associated with the data blocks in the at least one file, files relevant to a query can be rapidly found and accessed. If the at least one deepest common subdivision does not match the subdivisions for the hierarchical path identifier(s) for the operation, then the file does not contain any tuples that could match the operation. Multiple logical hierarchical data spaces can be used throughout this process to improve the selectivity of the operations. For instance, the file could be associated with subdivisions for multiple hierarchical data spaces. An operation that contains hierarchical path identifiers corresponding to the same logical hierarchical data spaces as the ones associated with the file can determine if the file is relevant to the query in all that hierarchical data spaces. If it is not relevant in even just one logical hierarchical data space, then the file is not relevant to the operation.

For example, files may be named in a way that specifies the common parent subdivision for all subdivisions in the file. A file's subdivision may also be specified in the path for the file. A set of files can be scanned, and the identity of the subdivision extracted. It can then be checked against the at least one subdivision determined in step 108.

The file may contain metadata or have a companion metadata file that includes one or more hierarchical path identifiers for the deepest parent subdivision for all subdivisions, a set of parent subdivisions in the file, or all the subdivisions contained in the file. Those hierarchical path identifiers can be read and then matched against the at least one subdivision determined in step 106.

The file and its corresponding at least one subdivision for the at least one hierarchical data space may be registered in a registrar. A registrar may be used to manage the associations between at least one subdivision of at least one LHDS and objects such as files, data blocks, subblock, pages, file metadata, data block metadata, subblock metadata, page metadata, or statistics. A registrar may support operations on these associations including, but not limited to, creation, retrieval, update, query, and deletion. A registrar may be implemented in multiple ways including, but not limited to, a software service, using a database, in-memory data structures, maps, trees, physical hierarchical data spaces, disk-based data structures, graphs, or persistent cache. The associated at least one subdivision may be the deepest common subdivision for all subdivisions, a set of common parent subdivisions in the file, or all the subdivisions contained in the file. The at least one subdivision of the at least one hierarchical data space determined in step 106 may be sent to the registrar. The registrar may then determine which files correspond to the subdivision. The registrar may hold the file associations using hierarchical data spaces so that the search of files corresponding to the at least one subdivision for at least one LHDS can be performed efficiently.

The metadata about the files, data blocks, subblocks, or pages may include the HPId for the at least one subdivision. It may include a set of common parent subdivisions for each file. It may include the hierarchical path identifiers for any child subdivisions of the at least one subdivision. The metadata may include statistics for the at least one subdivision as well as aggregated statistics for the child subdivisions of the at least one subdivision. Statistics may include, but are not limited to, the size of the tuples, the age of the tuples, average size of the tuples, median size of the tuples, average time of the tuples in the buffer, longest time of a tuple in the buffer, whether the tuples have been sorted, whether the tuples have been encrypted, whether the tuples have been compressed, the compressed size of the tuples, and compression ratio of the tuples. Statistics for each data block may be aggregated and stored in the at least one file, a companion file, or stored in a registrar and associated with the at least one file. The metadata may also include, but is not limited to, the location of the data block in the file, the size of the data block, the format of the data block, the location of any subblocks or pages, a timestamp, or the compression used to compress the contents of the data block.

Files with attributes that do not match other conditions may also be filtered out before being accessed. Any number of attributes with varying data types could be used. These attributes may specify the range of values for the tuples contained in the file. For example, an operation may only want to select files that correspond to the at least one subdivision of the at least one hierarchical data space and contain at least one tuple within a specified time interval. Attributes may also be represented by HPId or encrypted HPId instead of by value. Files can then be filtered probabilistically by any of these attributes to determine if the file may contain at least one tuple that matches the condition. The method may read these attributes, hierarchical path identifiers, or encrypted hierarchical path identifiers from the files themselves, companion files, file metadata, or file registrations and evaluate the condition. The condition may include multiple conjuncts or disjuncts. Conditions may also include negation. By using encrypted hierarchical path identifiers, the range of values contained in the files are hidden, though the files can still be filtered by those attributes or properties.

Step 110 will read at least one tuple from the at least one file. The method of reading at least one tuple from at least one file depends on how they were stored in the file. The tuples may have been stored within the file in a variety of ways, including, but not limited to, appending the at least one tuple and at least one HPId to the at least one file; appending the at least one tuple, wherein the at least one tuple includes at least one hierarchical path identifier; appending the at least one tuple to the at least one file and appending the location of the at least one tuple and at least one HPId to at least one second file; storing the at least one tuple in at least one data block of the at least one file wherein the at least one data block corresponds to the at least one subdivision of the logical hierarchical space; or storing the values for each attribute of the tuple in separate subblocks of at least one data block of the at least one file wherein the at least one data block corresponds to the at least one subdivision of the logical hierarchical space. The HPId identifies the at least one tuple's corresponding subdivision of the at least one logical hierarchical data space.

The at least one tuple may have been stored in at least one file corresponding to the subdivision of the at least one LHDS by appending the at least one tuple and at least one HPId to the at least one file. A limitation of this approach is that tuples corresponding to the same subdivision are unlikely to be stored together inside the at least one file. To perform an operation, all the tuples and their corresponding hierarchical path identifiers in the at least one file may be scanned. Any tuples with matching hierarchical path identifiers may then be retrieved. Instead of operating on tuples by value, the tuples may be evaluated probabilistically in each of the at least one logical hierarchical data space. Step 112 performs this probabilistic evaluation. For a tuple to be a candidate, it must have a subdivision of the at least one logical hierarchical space that matches the operation's at least one subdivision of the at least one logical hierarchical data space. If there are multiple logical hierarchical data spaces, the tuple must have a matching subdivision for each logical hierarchical data space. If they do not match in any logical hierarchical data space, then the tuple is not a candidate.

Hierarchical path identifiers may have been stored as a value in the tuple or separately. Since the HPId preserves the hierarchy of the subdivisions of the hierarchical data space, operations such as range, bounding, joins, and intersection query can be performed probabilistically. This approach would have performance of O(N) where N is the total number of tuples stored in the at least one file. Data updates and deletions may require special processing when executing operations.

The at least one tuple may be stored in the at least one file corresponding to the subdivision of the at least one LHDS by appending the at least one tuple to the at least one file and by appending the location of the at least one tuple and at least one HPId to at least one second file. The location may include the length of the stored tuple. An advantage of this approach is also append-only writing of the tuples and hierarchical path identifiers. Tuples corresponding to the same subdivision may not be stored together within the at least one file. To perform an operation, all the associated hierarchical path identifiers can be scanned by accessing the at least one second file. The location stored with any matching hierarchical path identifiers can then be used to retrieve the corresponding tuple from the set of first files. Instead of operating on tuples by value, they can be operated upon first probabilistically as shown in step 112 using logical hierarchical data spaces. Since the HPId preserves the hierarchy of the subdivisions of the hierarchical data space, operations such as range, bounding, joins, and intersection query can be performed probabilistically.

Using this method, hierarchical path identifiers can be included not only for the at least one logical hierarchical data space, but for logical hierarchical data spaces corresponding to the attributes of the tuples that are stored. These hierarchical path identifiers can be used to probabilistically filter the tuples by additional attributes. These hierarchical path identifiers can be encrypted if they are encrypted in a way that preserves the hierarchy of their corresponding hierarchical data space. If the size of hierarchical path identifiers is smaller than the size of the tuples, then this approach may be more efficient than using a single set of files, though still O(N) where N is the total number of tuples in the set of first files. Two sets of files would need to be maintained when data is added with this approach. If both sets of files are stored on the same disk, then random input/output will be high. Data updates and deletions may require special processing when executing operations.

The preferred method of storing the at least one tuple in at least one file is to store the at least one tuple in at least one data block of the at least one file wherein the at least one data block corresponds to the subdivision of the at least one logical hierarchical data space. Each data block that corresponds with a subdivision may only contain tuples that correspond to the subdivision and its child subdivisions. Each data block corresponds to a subdivision of each of the different logical hierarchical data spaces. Tuples that correspond to the same subdivision as a data block can be stored together in that data block. A parent data block may contain data blocks that correspond to child subdivisions of the parent data block's corresponding subdivision. Organizing the data blocks of a file in a way that maintains the hierarchical relationship of the subdivisions of the at least LHDS supports efficient access patterns.

The tuples being read from each data block with a corresponding subdivision may be evaluated probabilistically in each of the at least one logical hierarchical data space. Step 112 performs this probabilistic evaluation. For a tuple to be a candidate, it must have a subdivision of the at least one logical hierarchical space that matches the operation's at least one subdivision of the at least one logical hierarchical data space. If there are multiple logical hierarchical data spaces, the tuple must have a matching subdivision for each logical hierarchical data space. If they do not match in any logical hierarchical data space, then the tuple is not a candidate.

Each data block may hold metadata about the contents of the tuples that they are storing. As the process traverses the data blocks, it can evaluate a condition against the metadata to determine if the data block or any of its child data blocks contain tuples relevant to the operation. If the condition is met, then the data block needs to be accessed. If not, then the data block and none of its children need to be accessed.

The association between the data block and the subdivisions of each LHDS may be maintained so that a specific data block can be easily found by subdivision. Various methods of associating a data block with the at least one subdivision of the at least one LHDS are contemplated including, but not limited to, storing a HPId with the data block, storing a HPId with the data blocks metadata, storing a HPId in a lookup table, storing a HPId in a physical hierarchical data space, registering the association with a register, or storing the association in a data structure in a file.

The data blocks of the file may be organized in a variety of ways that maintains the hierarchical relationship of the subdivisions of the logical hierarchical data spaces including, but not limited to explicitly maintaining the hierarchy by nesting data blocks within other data blocks with corresponding subdivisions, explicitly maintaining the hierarchy by including pointers to child data blocks in each data block, or implicitly maintaining the hierarchy using an association between each data block and their corresponding subdivisions of each logical hierarchical data space.

The at least one tuple may be stored in a data block that can only be found by following the pointers from a root data block to its child data blocks that correspond to the subdivision of each of the different logical hierarchical data spaces. Each data block may maintain the location of each of its child data blocks. To perform an operation with a corresponding subdivision, the operation will start by reading the root data block, read the location of its children, and then access the necessary child data blocks. This may be repeated until all the relevant data blocks are accessed, and the at least one tuple read. The only way to access a data block is to start at the root. This may require many random input/output operations as each data block may be stored anywhere on disk. Multiple files may be used if the pointers are able to reference which file contains a specified data block.

The at least one tuple may be stored in at least one data block wherein the data blocks maintain the hierarchical relationship of the subdivisions of the logical hierarchical data spaces by storing child data blocks within the data block. Operations can then access applicable child data blocks by traversing the data block's child data blocks located within the data block. This allows data blocks corresponding to an operation's subdivision to be found using the association as well as by traversing the data blocks. Without associations, every data block would only be accessible by traversing the nested data blocks starting at a root data block for each file. It is possible for there to be an extremely large number of subdivisions in a hierarchical data space and an extremely large number of corresponding data blocks. It may not be desirable to maintain an association between each data block and subdivision. The preferred embodiment allows that to be managed by limiting which associations are kept. All associations do not have to be kept because child data blocks may be accessed within their parent data block. This allows keeping some data blocks stored outside of their parent data blocks. The reason this is possible is that the child data blocks can be accessed if an association exists with their corresponding subdivision. Some data blocks may not contain many tuples. The preferred embodiment allows these tuples to be stored in a parent data block instead, thereby enabling a way to reduce the total number of data blocks.

The preferred embodiment also allows efficient access to data blocks in different files that correspond to the same subdivision of a LHDS because they can be found by accessing the associations between data blocks and subdivisions. This also provides more efficient use of immutable files, where files are only written once and read many times. Mutations are written to new files and resolved when operations execute.

Various embodiments for reading tuples from a data block are contemplated, including but not limited to reading the tuple as an ordered sequence of values, an unordered sequence of values, as serialized structured data, as an array of values, as a map of attribute/value, or lists of values. In at least one embodiment, the tuple can be composed from the values stored in different subblocks of the data block. These subblocks may be efficiently compressed because the data types are the same or the values for the same attribute in multiple tuples are likely to be similar. Grouping tuples by the subdivisions for at least one LHDS corresponding to a common attribute increases the likelihood that the values for the same attribute for those tuples will have similar values, facilitating improved compression ratios.

Once the file or data block has been identified, the tuples stored there may be read. The tuples being read may be compressed. Various compression techniques are contemplated including, but not limited to, dictionary encoding, run-length encoding, entropy encoding, Huffman coding, or special purpose compression algorithms. Compression may be performed while reading the tuples.

The tuples being read may be encrypted. Decryption may be performed when reading the tuples. The tuples may also be read in encrypted form and returned by the data operation for decryption by the client or application invoking the data operation.

Organizing data in files and data blocks using hierarchical data spaces provides extraordinarily fast and selective access to tuples relevant to a given operation. Using hierarchical path identifiers, operations can search a registrar for candidate files and data blocks that could contain relevant data. Using multiple logical hierarchical data spaces can then filter those files and data blocks to further narrow them down. The remaining file and data blocks can then be accessed to find and retrieve candidate tuples without evaluating them by value. This reduces input/output costs, latency, and eliminates the need to expose values in file storage or candidate query processing.

Figure 1D:
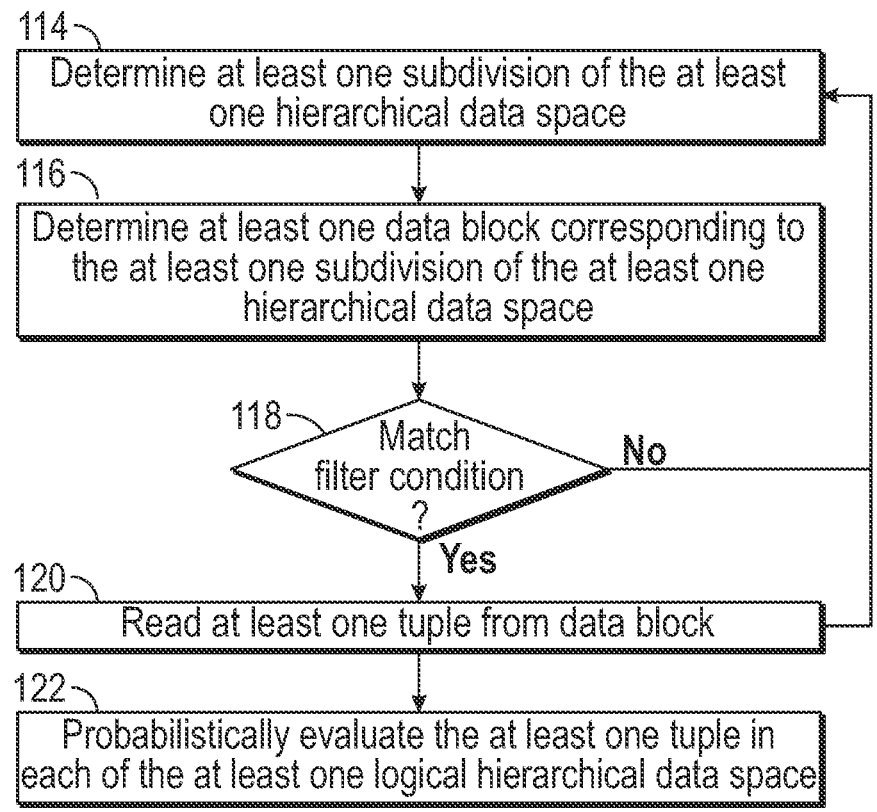
FIG. 1D shows a method for executing a data operation by traversing the data blocks of a file that are organized in a way that preserves the hierarchy of at least one logical hierarchical data space according to various embodiments.

FIG. 1D shows a method for executing a data operation by traversing the data blocks of a message or of a file that are organized in a way that preserves the hierarchy of at least one logical hierarchical data. Step 114 determines at least one subdivision for at least one logical hierarchical data space.

Step 116 determines at least one data block that corresponds to the at least one subdivision of the at least one hierarchical data space. If multiple hierarchical data spaces are chosen, the data blocks must correspond to at least one subdivision of each chosen hierarchical data space. Data blocks that do not have a corresponding subdivision for each of the hierarchical data spaces chosen in step 114 will not be selected. The data blocks that cannot hold data applicable for the data operation to be excluded from processing, eliminating the input/output operations required to open and read the data block. There are multiple ways of determining at least one data block that corresponds to the at least one subdivision of the at least one hierarchical data space including, but not limited to, reading external metadata about the data blocks, reading the metadata from inside a file, message, or other container holding the data blocks and extracting the association between a data block and the subdivisions it corresponds to, extracting the association between a data block and the subdivisions it corresponds to from a separate file or message, or querying a registrar by sending the at least one subdivision to the registrar and having it determine which data blocks have corresponding subdivisions.

Data blocks may also be filtered if attributes of the data blocks do not match specified conditions. Any number of attributes with varying data types could be used. These attributes may specify the range of values for the tuples contained in the data block. For example, an operation may only want to select data blocks that correspond to the at least one subdivision of the at least one hierarchical data space and contain at least one tuple within a specified time interval. Attributes may also be represented by HPId or encrypted HPId instead of by value. Data blocks can then be filtered probabilistically by any of these attributes to determine if the data block may contain at least one tuple that matches the condition. The method may read these attributes, hierarchical path identifiers, encrypted hierarchical path identifiers, or bloom filters, companion files, file metadata, data block metadata, or file registrations and evaluate the condition. The condition may include multiple conjuncts or disjuncts. Conditions may also include negation. By using encrypted hierarchical path identifiers, the range of values contained in the data blocks are hidden, though the data blocks can still be filtered by those attributes or properties.

Once a data block has been determined, a tuple can be read from it or its subblocks or pages. Tuples associated with the same subdivision of the at least one LHDS are stored together in the same data block. Queries or other operations that are looking for tuples for a given subdivision can find the corresponding data blocks and read the tuples in those data blocks. Input/output operations are expensive on storage devices. By organizing the tuples using the subdivisions of a hierarchical data space, the amount of input/output to access the tuples can be minimized. By associating the data block with the subdivision of the at least one LHDS it contains and metadata about the data block such as size and location, data blocks relevant to a query can be rapidly found and accessed.

Multiple different logical hierarchical data spaces can be used to improve the selectivity of a query or other operation against a given data block. For instance, the data block can be associated with hierarchical path identifiers for multiple different hierarchical data spaces. A query that contains hierarchical path identifiers corresponding to the same hierarchical data spaces as the ones associated with the data block can determine if the data block is relevant to the query in all those hierarchical data spaces. If it is not relevant in even just one hierarchical data space, then the data block is not relevant to the query.

Step 118 checks the data block that corresponds to the at least one subdivision to determine if it may contain tuples that match a condition. If it does not contain tuples that match a condition, then it will not be accessed. Step 114 may be repeated to determine if there are additional subdivisions of the at least one hierarchical data space to process. If the data block may contain tuples that match the condition, then step 120 will read the at least one tuple from the data block. Step 114 may traverse the subdivision's child subdivisions to visit the child data blocks of the initially determined data block of step 116. The operation may use other methods of determining the at least one subdivision of the at least one hierarchical data space.

Step 122 will evaluate each tuple against the subdivision determined for each logical hierarchical data space. If a tuple's corresponding subdivision are not a match for the operation in each logical hierarchical data space, then the tuple is not a match for the operation.

Figure 2A:
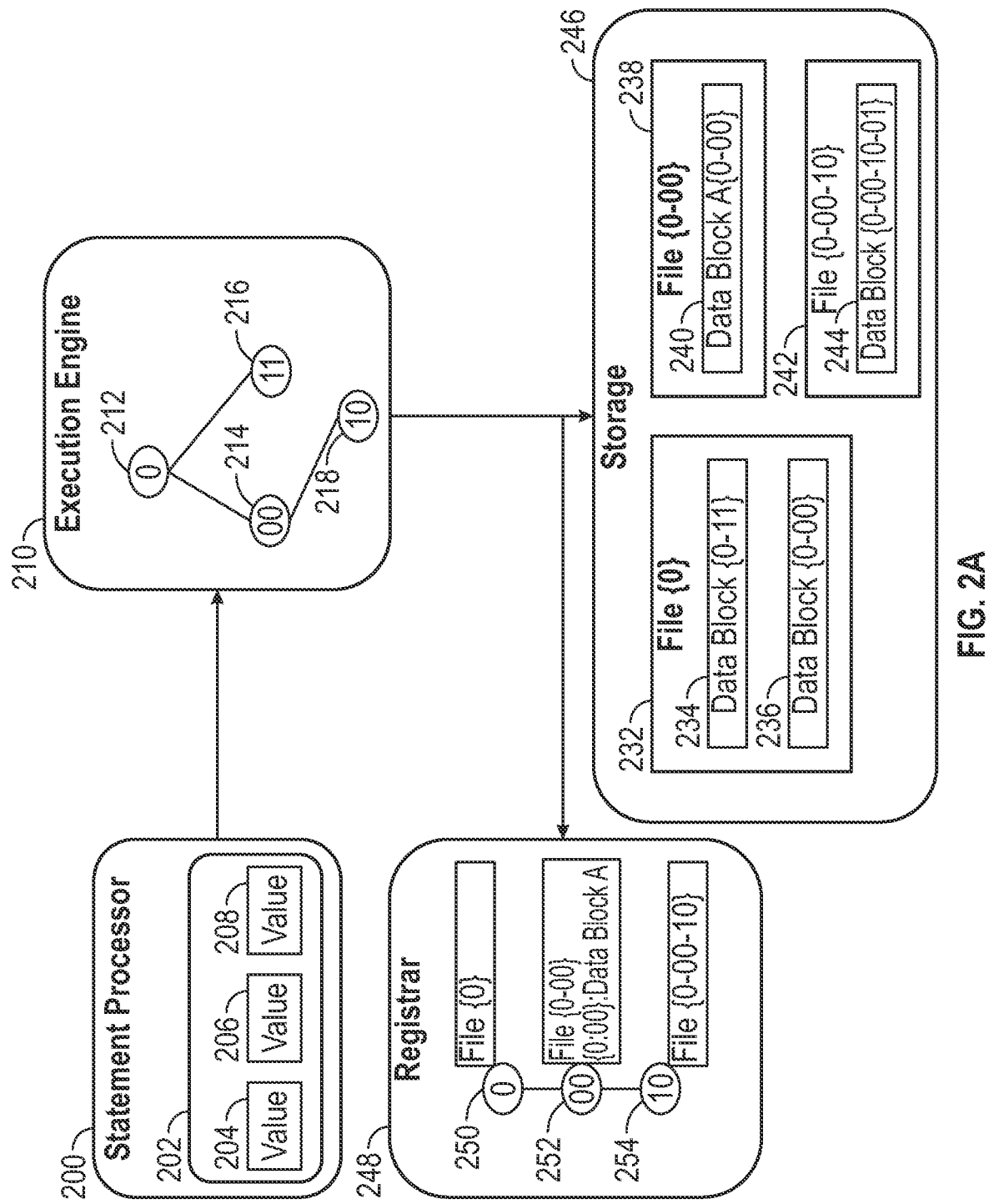
FIG. 2A shows a system for executing a data operation using files organized using at least one logical hierarchical data space according to various embodiments.

FIG. 2 shows a system for executing data operations using hierarchical data spaces. Statement processor 200 transforms a statement for performing operations on one or more relations into operations in one or more hierarchical data spaces. A hierarchical data space operation is an operation that uses one or more hierarchical path identifiers to accomplish a given task.

A statement comprises at least one operation on at least one relation, set, map, list, collection, or group of data items. Statements can be written in any declarative language such as SQL, any imperative language such as C or Java, or a combination. Statement elements may include but are not limited to expressions, operators, functions, constants, conditions, variables, values, and sub-statements.

Tuple 202 contains values 204, 206, and 208. Statement processor 200 chooses one or more logical hierarchical data spaces for the operation and determines the subdivisions of the one or more logical hierarchical data spaces. Depending on the operation, one or more of the values 204, 206, or 208 may be chosen. The chosen value or values will be used to determine the corresponding subdivision.

Execution engine 210 will execute the operation by determining which file or files correspond to the subdivision and then reading the tuples necessary to perform the operation. It may send a HPId for the subdivision determined by the statement processor to registrar 248. Registrar 248 may then look at the registered files and data blocks to determine which correspond to the hierarchical path identifier.

When the files are stored in storage 246, the association between the file and at least one subdivision of the at least one LHDS may be registered with registrar 248. That association may also contain a map between each data block and at least one subdivision of the at least one logical hierarchical data space. By registering the file and the data blocks based on at least one subdivision of at least one logical hierarchical data space, operations can quickly find the files and data blocks that may contain tuples for the corresponding hierarchical path identifiers. By using physical hierarchical data space 250 to maintain the registration of each file and their corresponding subdivision of the at least one logical hierarchical data space, the registrar can rapidly determine the relevant files for the operation. This provides a highly scalable way to manage massive quantities of data at a granular level. For instance, a petabyte of data could be stored in one million 1 GB sized files. Each of those one million files can be registered in physical hierarchical data space 250. An operation on a single specific subdivision, such as subdivision 254, can quickly retrieve the files that cover or intersect subdivision 254. Those files can then be accessed to perform the operation.

The information registered in subdivision 252 about the file contains a mapping of a subdivision identified by HPId {0-00} to a data block {Data Block A}. By including mappings of subdivisions to data blocks, the relevant data blocks for an operation can be accessed instead of loading the entire file. It is possible for there to be billions of subdivisions for exceptionally large data sets. If the data or tuples for each subdivision are stored in their own data block, the number of file mappings needed to be managed by the registrar could become very large. If the data blocks maintain the hierarchy of the hierarchical data space, then instead of storing all the mappings from subdivisions to data block offsets, mappings can be stored for a chosen set of data blocks that are parent subdivisions to the other data blocks. In this way, the amount of data stored in each registration can be limited. The metadata, including statistics, for each file and data block may also be stored in registrar 248.

If the at least one subdivision is identified by HPId {0}, then file {0} in subdivision 250 is a match. Depending on the operation, child subdivision 252 and child subdivision 254 may also contain a match. For example, a point query or equality query with HPId {0} would only match subdivision 250. A range or bounding query with HPId {0} would also match child subdivision 252 and child subdivision 254 because the child subdivisions may need to be accessed for those query types. For some query types, the parent subdivisions need to be accessed as well. For example, if the at least one subdivision has a HPId of {0-00-10}, then file 238 with HPId {0-00} and file 232 with HPId {0} may contain tuples relevant to a spatial intersection query.

Multiple files and multiple data blocks can correspond to the same subdivisions. For example, file 232 has data block 236 with HPId {0-00}. File 238 also has a data block that corresponds to subdivision with HPId {0-00}. For some data operations, every file and data block that corresponds with the at least one subdivision of the at least one hierarchical data space will be accessed.

The file registration or data block registration associated with these subdivisions would be returned to the execution engine 210. Execution engine could then use storage 246 to access file 232, file 238, and file 242. In some cases, each data block in a file will not be applicable to a given data operation. For example, data block 234 has an HPId of {0-11} and data block 236 has an HPId of {0-00}. Data block 234 with HPId {0-11} cannot have any relevant data for a data operation for {0-00-10}. Therefore, data block 234 will not need to be retrieved to perform the data operation. If storage 246 supports reading parts of a file, then this can be used for efficiently accessing data. Metadata about the data block is needed for execution engine 210 to determine the offset and number of bytes to read from the file.

An alternative embodiment is to have storage 246 receive a request for accessing the at least one subdivision and have it contact registrar 248 to determine which files, data blocks, subblocks, or pages to return. Another embodiment is for storage 246 to manage the associations between files, data blocks, subblocks, or pages with subdivisions.

For some data operations, execution engine 210 may use a secondary hierarchical data space to determine the at least one subdivision of the at least one hierarchical data space. Secondary hierarchical data space 212 may be the results of another operation or provided as input for an operation. For each subdivision of secondary hierarchical data space 212, the files or data blocks that correspond can be determined and then the operation performed using those files or data blocks. Subdivision 212 corresponds to file 232 and data block 234 and data block 236. Subdivision 214 corresponds to file 238 and data block 240. Subdivision 216 corresponds to data block 234. Subdivision 218 corresponds to file 245 and data block 244.

Figure 2B:
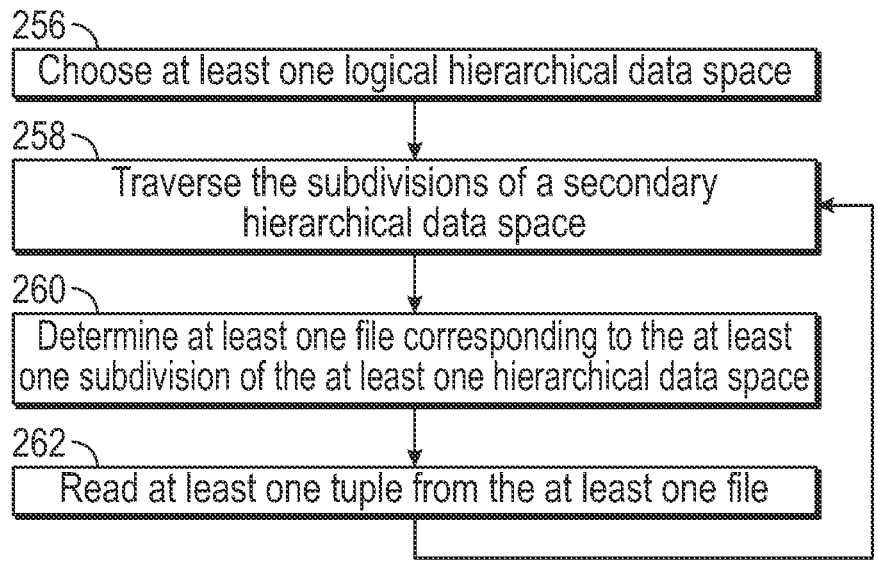
FIG. 2B shows a method for executing a data operation by traversing the subdivisions of at least one secondary logical hierarchical data space to determine at least one file according to various embodiments.

FIG. 2B shows a method for executing a data operation by traversing the subdivisions of at least one secondary LHDS to determine at least one file. Step 256 chooses at least one logical hierarchical data space. Step 258 traverses the secondary hierarchical data space. For instance, in hierarchical data space 212, subdivision {0}, subdivision {0-00}, subdivision {0-00-10} and subdivision {0-11} will be visited. Step 260 will determine at least one file that corresponds to each subdivision that is traversed in step 258. Step 262 will read at least one tuple from each of those files to perform the operation. The data blocks that are applicable can also be determined and accessed to avoid the input/output required to access the entire file. To do this, the metadata about the data blocks of a file is needed.

Traversal is the process of visiting each subdivision in one or more hierarchical data spaces. Since physical hierarchical data spaces can contain multiple hierarchical data spaces, traversing a physical hierarchical data space may visit subdivision from multiple hierarchical data spaces. Traversal can also start at any subdivision in a hierarchical data space. The subdivision to start traversal can be specified by at least one hierarchical path identifier, since they identify the subdivisions in a hierarchical data space. Traversal can be performed in different ways to control the order the subdivisions are visited or operated upon. These traversal methods include, but are not limited to, depth-first, pre-order, post-order, in-order, reverse pre-order, reverse post-order, reverse in-order, or breadth-first. Traversal methods for certain operations such as bounding, or intersection queries can also include parent subdivisions.

Coordinated traversal is a way of efficiently traversing multiple physical hierarchical data spaces so that common subdivisions are visited at the same time. The method of coordinated traversal may vary depending on the selected method of traversing the hierarchical data space.

The traversal of the secondary hierarchical data space 212 in step 258 can be coordinated with the traversal of the files and data blocks organized using hierarchical data spaces. For example, coordinated traversal can be used to merge multiple files organized using corresponding hierarchical data spaces.

Figure 2C:
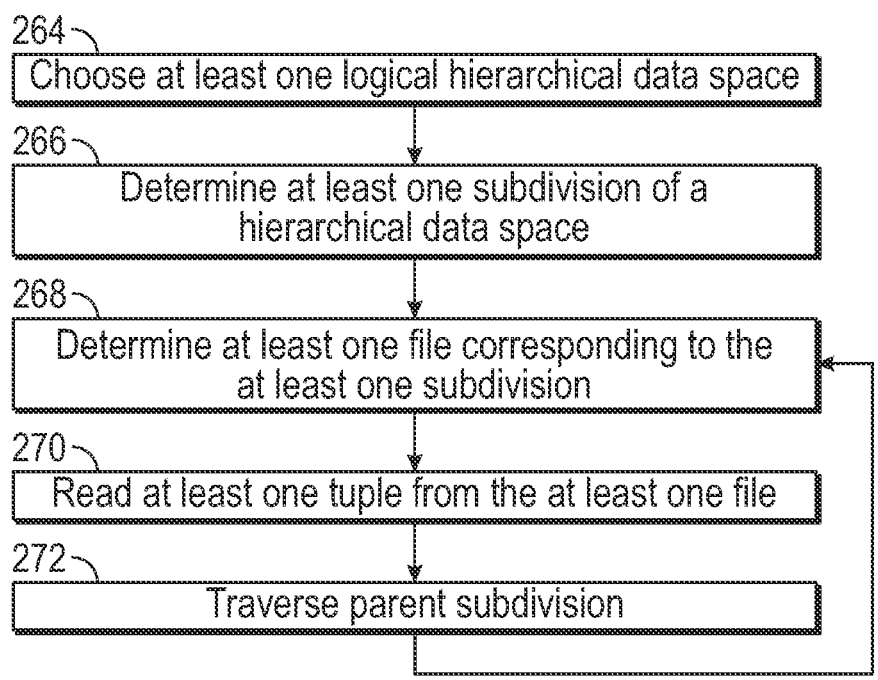
FIG. 2C shows a method for executing a data operation by traversing the parent subdivisions of at least one subdivision of at least one logical hierarchical data space to determine at least one file according to various embodiments.

FIG. 2C shows a method for executing a data operation by traversing the parent subdivisions of at least one subdivision of at least one LHDS to determine at least one file. Traversing parent subdivisions is useful for performing data operations such as intersection queries that determine for a given value all the tuples that intersect a given value. In step 264, at least one LHDS is chosen. In step 266, at least one subdivision of the at least one LHDS is determined for the data operation. This is the starting subdivision. Step 268 determines at least one file corresponding to the at least one subdivision. Step 270 reads at least one tuple from the at least one file. Step 272 then traverses the next parent subdivision of the at least one subdivision. Step 268 is then repeated to determine at least one file that corresponds to the next parent subdivision.

Figure 3A:
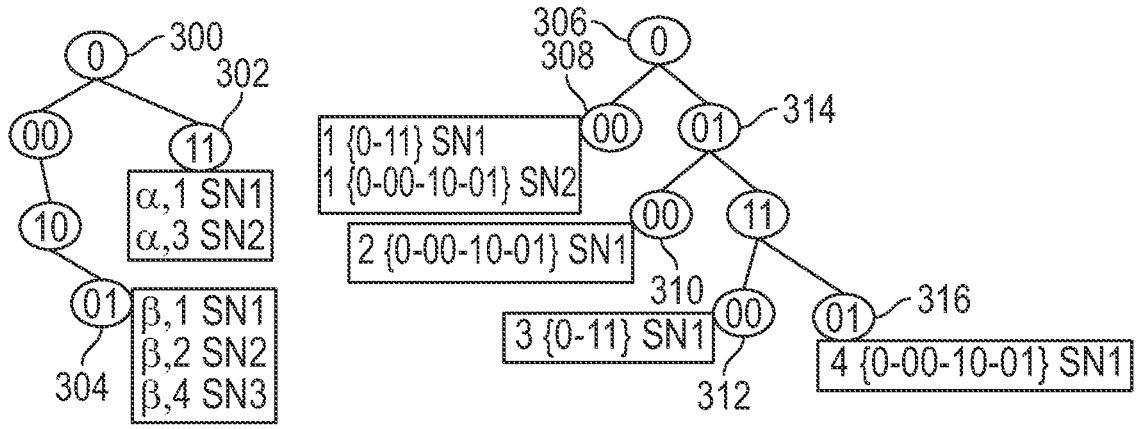
FIG. 3A shows tuples organized in hierarchical data spaces according to various embodiments.

FIG. 3A shows tuples organized in hierarchical data spaces. Physical hierarchical data space 300 contains a set of tuples from relation 334 and relation 336. Tuple ($\alpha$, 1) is located subdivision 302 {0-11} because data value $\alpha$ corresponds to subdivision {0-11} of the logical hierarchical data space. This tuple has sequence number (SN) of 1. Each subdivision of the at least one LHDS may issue sequence numbers unique to the subdivision to identify each tuple. Tuple ($\alpha$, 3) is also located in subdivision 302 {0-11} because data value a corresponds to subdivision {0-11}. The value of a is projected into a hierarchical data space in subdivision 302 {0-11}. Tuple ($\beta$, 1) is in subdivision 304 {0-00-10-01} because data value $\beta$ corresponds to subdivision {0-11}. The value $\beta$ is projected into the hierarchical data space in subdivision 304 {0-00-10-01}. Tuple ($\beta$, 2) and tuple ($\beta$, 4) are also located in subdivision 304 {0-00-10-01}. Each data attribute for relation can be kept in each tuple.

Physical hierarchical data space 306 contains tuples from relation 334 and relation 336. These tuples are placed in the subdivisions for the hierarchical path identifiers for the value of column B. These tuples point to the subdivisions in physical hierarchical data space 300 that contain the tuples for each relation. This allows the hierarchical path identifiers for the values in column B to be used to find the tuples for the row. To find the tuples where the column B value is 3 with HPId {0-01-11-00), the tuples stored in subdivision 312 {0-01-11-00} are accessed. Tuple (3, {0-11}) is found. This tuple points to the subdivision 302 {0-11} of physical hierarchical data space 300. The tuples present there are ($\alpha$, 1) and ($\alpha$, 3). The tuples can then be evaluated to see if its column B value matches 3. Tuple ($\alpha$, 3) matches, and it is therefore the result. This method allows multiple physical hierarchical data spaces to be used to store and probabilistically query relationships between the attributes of a relation.

Figure 3B:
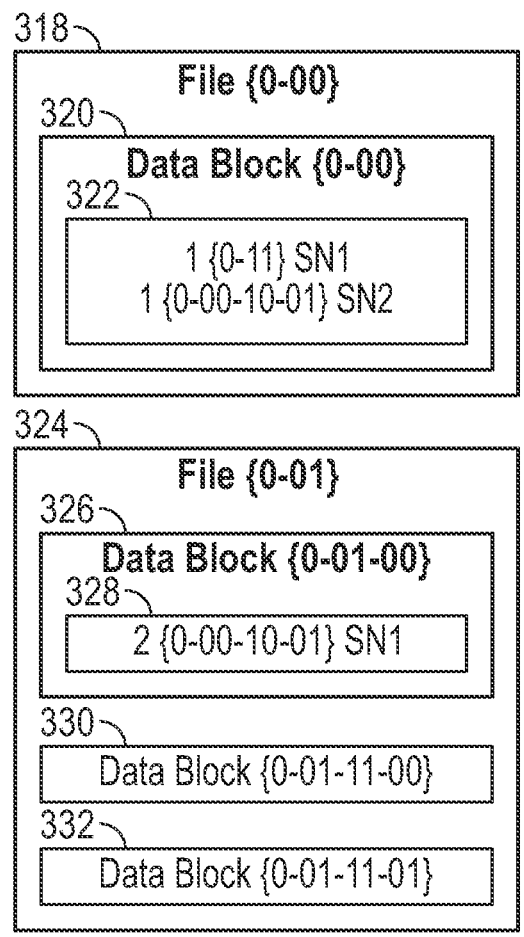
FIG. 3B shows information stored in one or more files and data blocks corresponding to at least one subdivision of at least one logical hierarchical data space using hierarchical data spaces according to various embodiments.

FIG. 3B shows information stored in one or more files and data blocks corresponding to at least one subdivision of at least one LHDS using hierarchical data spaces. The tuples from physical hierarchical data space 306 are stored in a set of files and data blocks. File 318 and File 324 store correspond to different subdivisions of the hierarchical data space. File 318 contains a data block 320 {0-00} which corresponds to subdivision {0-00}. Data block 320 stores the tuples (1, {0-11}) and (1, {0-00-10-01}) from subdivision 308. These tuples are stored in a subblock 322 of data block 318. File 324 stores subdivision 314 {0-01}. Data block 326 contains tuple 328 from subdivision 310. Various embodiments for arranging the data blocks in a file are contemplated, but not limited to, storing all the data blocks at the same level of the file, or arranging the data blocks in the file in a way that preserves the hierarchy of a hierarchical data space. Storing the data blocks while preserving the hierarchy of a hierarchical data space provides for more efficient input/output when searching for tuples in specific subdivisions. This also allows for subdivisions with a minimum number of tuples to be aggregated in parent subdivisions. Data block 330 {0-01-11-00} and data block 332 {0-01-11-01} are shown in FIG. 3B arranged in a flat arrangement.

FIG. 3C shows two relations with values and hierarchical path identifiers for two columns. FIG. 3D shows tuples from relation 334 and relation 336 stored in multiple files, data blocks, and subblocks corresponding to the subdivisions of a hierarchical data space. File 338 {0-00} contains a data block 340 {0-00-10-01). Instead of all the attributes of the tuples being stored together like they are in subblock 322, the attributes of the tuples from subdivision 304 are shredded and stored as a column of values. For instance, subblock 342 holds the value $\beta$ for tuples ($\beta$, 1), ($\beta$, 2), and ($\beta$, 4). Subblock 344 holds the values 1, 2, 4 for ($\beta$, 1), ($\beta$, 2), and ($\beta$, 4). Subblock 346 holds sequence numbers assigned to the tuples ($\beta$, 1), ($\beta$, 2), and ($\beta$, 4). The reason for shredding them into different lists of values is that grouping values together that have the same data type allows them to be more efficiently compressed. Subblock 342 can use run length compression to store the value $\beta$ once for three tuples. File 348 {0-11} contains tuples corresponding to subdivision 302. These tuples are stored in data block 350. The tuples are split by attribute in subblock 352 and subblock 354 and subblock 356. By shredding the tuples by attribute into multiple subblocks, operations that access specific attributes can avoid the input/output cost of loading subblocks for irrelevant attributes. The sequence numbers for the tuples are stored in subblock 356. Sequence numbers may be assigned to tuples corresponding to a subdivision of the at least one logical hierarchical data space. Sequence numbers corresponding to a subdivision are independent from every other subdivision. In other words, sequence numbers are not unique across subdivisions, but they are unique for a subdivision. By assigning sequence numbers, each tuple can be identified by its corresponding subdivision in each LHDS and by the sequence number.

A benefit of using hierarchical data spaces to organize information is that it is highly likely that information stored together in a subdivision is similar. The tuples may have the same value for the attribute used to generate their hierarchical path identifier. Values of other attributes of each tuple may also be highly likely to be similar in value or range. Values that are similar or have the same data type and are in a limited range can be compressed very efficiently. For example, in subblock 342, β (3) denotes the value β repeats 3 times. This run-length compression can substantially reduce the amount of storage required.

Tuples in the same subdivision can be sorted by multiple attributes to further improve compression ratio. Once tuples are grouped in this way by a subdivision of their at least one logical hierarchical data space, sorting the tuples of a single subdivision is much more efficient than sorting the entire set of tuples.

Figure 4A:
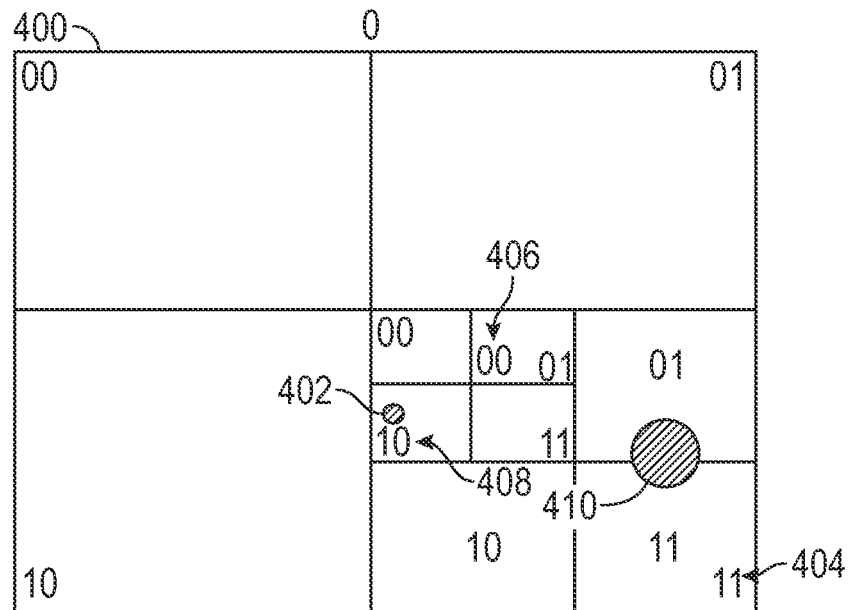
FIG. 4A shows a subset of hierarchical subdivisions for a hierarchical data space and values corresponding to various subdivisions of the hierarchical data space according to various embodiments.

FIG. 4A shows a subset of hierarchical subdivisions for a hierarchical data space and values corresponding to various subdivisions of the hierarchical data space. In various embodiments, the method may be used with hierarchical data spaces that include one or more dimensions. In the illustrated embodiment, the hierarchical data space has two dimensions. The initial data space 400 is subdivided into four quadrants. Since data value 402 is in subdivision 404 {11} of data space 400, the label {11} is appended to the initial data space's HPId {0} depth 0, resulting in HPId {0-11} with depth 1. Depth indicates the number of steps from the root of the data space that the HPId includes. Depth can also be viewed as the number of subdivisions from the root of the data space. For instance, in the illustrated embodiment, depth 1 indicates that the HPId includes one step from the root or the first subdivision. Depth 10 would indicate that the HPId represents a path with 10 steps or 10 subdivisions from the root. Since data value 402 is located in subdivision 404 {11} of initial data space 400, subdivision 404 {11} of data space 400 is chosen to be subdivided. Since data value 402 is in subdivision 406 {00} of subdivision 404, {00} is appended to the hierarchical path identifier, resulting in path {0-11-00} with depth 2. The next subdivision containing data value 402 is subdivision 408 {10}, resulting in path {0-11-00-10} with depth 3. The recursive process may continue until the depth reaches the maximum depth or the data value is no longer contained in a single subdivision. Data values with size and shape may not reach the maximum depth while point values reach a maximum depth. The result is HPId shown in tuple 402.

Since the HPId may terminate before maximum depth is reached, there can be many subdivisions with greater depth beneath this hierarchical path identifier. Thus, in at least one embodiment, HPId {0-11-00-10} depth 3 shown in tuple 402 may be used to indicate an interest in the subdivision plus all its child subdivisions and all its parents all the way to the root.

FIG. 4A also shows a query 410 that crosses a boundary of two subdivisions. The HPId generated for query 410 would be {0-11} (Depth 2) because it is not fully contained in {0-11-01} or {0-11-11}. Therefore, all of node 404 {0-11} and its children would have to be accessed in any query.

Figure 4B:
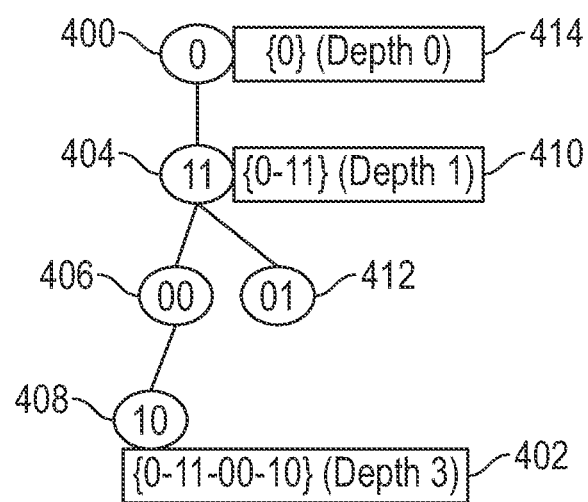
FIG. 4B shows a physical hierarchical data space containing tuples with values corresponding to the various subdivisions of the logical hierarchical data space of FIG. 4A according to various embodiments.

FIG. 4B shows a physical hierarchical data space containing tuples with values corresponding to the various subdivisions of the LHDS of FIG. 4A. Node 400 corresponds to the root of the LHDS 400 {0} in FIG. 4A. Node 404 corresponds to subdivision 404 {0-11} in FIG. 4A. Node 406 corresponds to subdivision 406 {0-11-00}. Node 408 corresponds to subdivision 408 with path {0-11-00-10} in FIG. 4A. The calculated HPId {0-11-00-10} depth 3 describes the path to node 408 in the physical hierarchical data space. Since HPId 408 can also be used to indicate interest in node 408 and any of its children, hierarchical path identifiers can be used for performing certain types of queries such as range, bounding, and intersection queries. For instance, a query can go to the subdivision 404 {0-11} specified by the HPId and then evaluate all the data tuples in that subdivision and search all child subdivisions. The hierarchical nature of this method may be employed to provide that all values contained by 404 {0-11} are contained in its child subdivisions.

Because of the preservation of hierarchy in hierarchical data spaces, a container capable of holding or storing data that corresponds to subdivision {0-11-00-10} may hold or store data corresponding to subdivision {0-11-00-10} or any of its child subdivisions. It may not hold or store data for any other subdivisions. For example, a container that corresponds to subdivision {0-11-00-10} may not hold or store data with corresponding subdivision {0-11-00} or corresponding subdivision {0-11-00-11}.

A value that corresponds to a subdivision may be held or stored in that subdivision or in any of the subdivision's parent subdivisions. It may not be held or stored in the subdivision's children. Value 402 corresponds with subdivision {0-11-00-10}. It also corresponds with subdivision {0-11-00}, subdivision {0-11}, and subdivision {0}. Value 402 may not be stored or held in a container with that is a child of subdivision {0-11-00-10} because there is no way to know which child subdivision corresponds to the data value. {0-11-00-10} depth 3 does not specify any subdivisions past depth 3.

Value 414 corresponds with subdivision 400 {0} but does not correspond with subdivision 404 {0-11}. This is because the HPId does not specify any subdivisions past depth 0. Value 410 corresponds with subdivision 404 {0-11} and subdivision 400 {0}. Value 410 does not correspond with subdivision 406, subdivision 408, or subdivision 412.

Figure 5A:
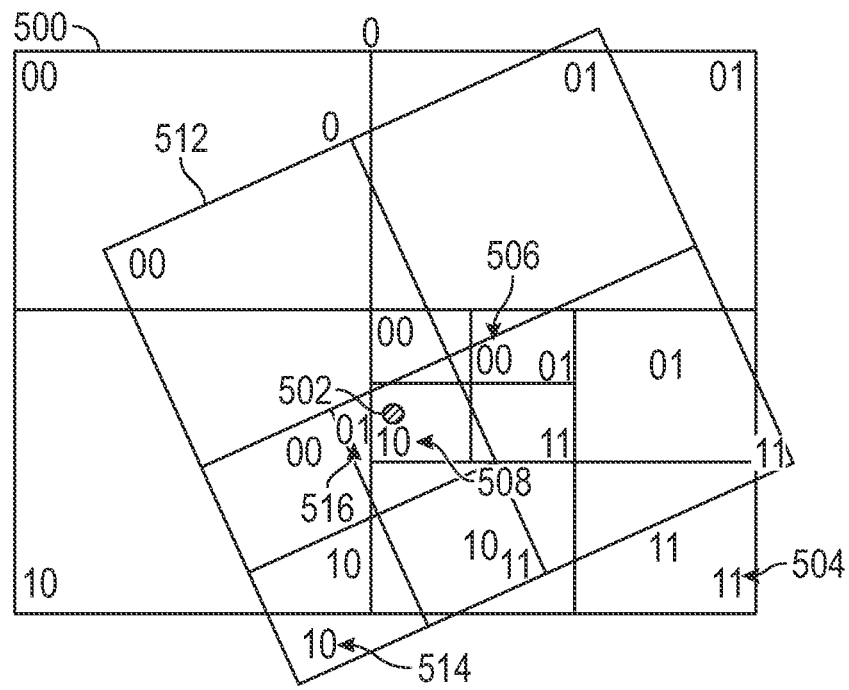
FIG. 5A shows a subset of hierarchical subdivisions for two different hierarchical data spaces and values corresponding to various subdivisions of the hierarchical data spaces according to various embodiments.

FIG. 5A shows a subset of hierarchical subdivisions for two different hierarchical data spaces and values corresponding to various subdivisions of the hierarchical data spaces. Using multiple different logical hierarchical data spaces allows for more efficient queries of the contents of a physical hierarchical data space and more selective probabilistic filtering during those queries.

The initial LHDS 500 is subdivided into four quadrants. Since data value 502 is located in subdivision 504 {11} of data space 500, the label {11} is appended to the initial data space's HPId {0} depth 0, resulting in HPId {0-11} with depth 1. Since data value 502 is located in subdivision 506 {00}, {00} is appended to the hierarchical path identifier, resulting in path {0-11-00} with depth 2. The next subdivision containing data value 502 is 508 {10}, resulting in HPId 518 {0-11-00-10} with depth 3. If max depth is 3 or the data value was contained in multiple child subdivisions, the process would terminate.

The second LHDS 512 is different from the first LHDS 500. In the illustrated embodiment, LHDS 512 is scaled, translated, and rotated. Data value 502 has a different path through the subdivisions in LHDS 512 than in LHDS 500. To get improved selectivity through using multiple logical hierarchical data spaces, those logical hierarchical data spaces must be different.

The second LHDS 512 is subdivided into four quadrants. Since data value 502 is located in subdivision 514 {10} of data space 512, the label {10} is appended to the initial data space's HPId {0} depth 0, resulting in HPId {0-10} with depth 1. Since data value 502 is located in subdivision 516 {00}, {01} is appended to the hierarchical path identifier, resulting in path {0-10-01} with depth 2. If the tuple is contained in multiple child subdivisions or max depth is reached, the process stops.

Figure 5B:
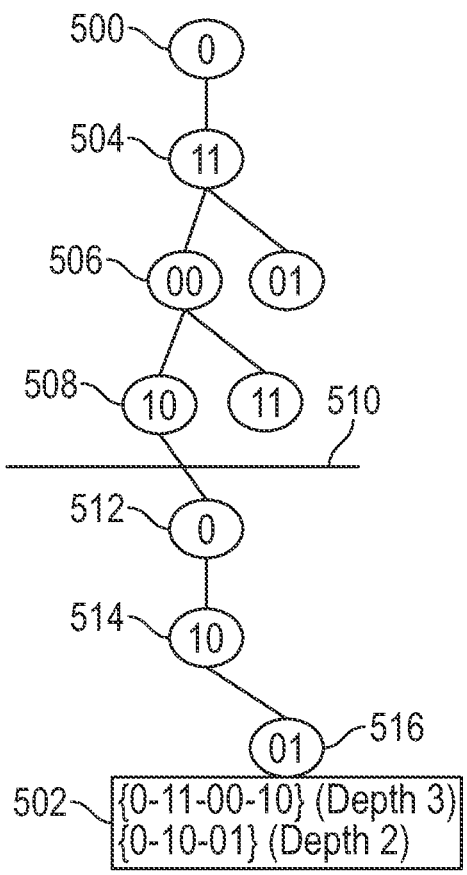
FIG. 5B a physical hierarchical data space containing tuples with values corresponding to the various subdivisions of two different logical hierarchical data spaces of FIG. 5A according to various embodiments.

FIG. 5B shows a physical hierarchical data space containing tuples with values corresponding to the various subdivisions of two different logical hierarchical data spaces shown in FIG. 5A. Node 500 corresponds to the root of the LHDS 500 {0} in FIG. 5A. Node 504 corresponds to subdivision 504 {0-11}. Node 506 corresponds to subdivision 506 {0-11-00} in FIG. 5A. Node 508 corresponds to subdivision 508 with path {0-11-00-10}. The calculated HPId {0-11-00-10} depth 3 describes the path to node 508 in the physical hierarchical data space. Node 508 is connected to a subtree or subgraph representing the subdivisions and hierarchy for a second hierarchical data space 512. This subtree has a node 512 {0} with a child node 514 {0-10} corresponding to subdivision 514. Node 514 has a child node 516 corresponding to subdivision 516. Node 514 has a tuple corresponding to data value 502. A tuple with hierarchical path identifiers corresponding to a data value with two different logical hierarchical data spaces can therefore be stored in a single physical hierarchical data space. The benefit is that there may be many tuples that have the same HPId {0-11-00-10} for the first LHDS but have different hierarchical path identifiers for the second logical hierarchical data space. By storing them in an attached subtree representing the subdivisions of the second logical hierarchical data space, the tuples are more distributed. A query with hierarchical path identifiers for both hierarchical data spaces can therefore walk through the nodes of the physical hierarchical data space, avoiding having to access tuples that are not on the query path.

Figure 6A:
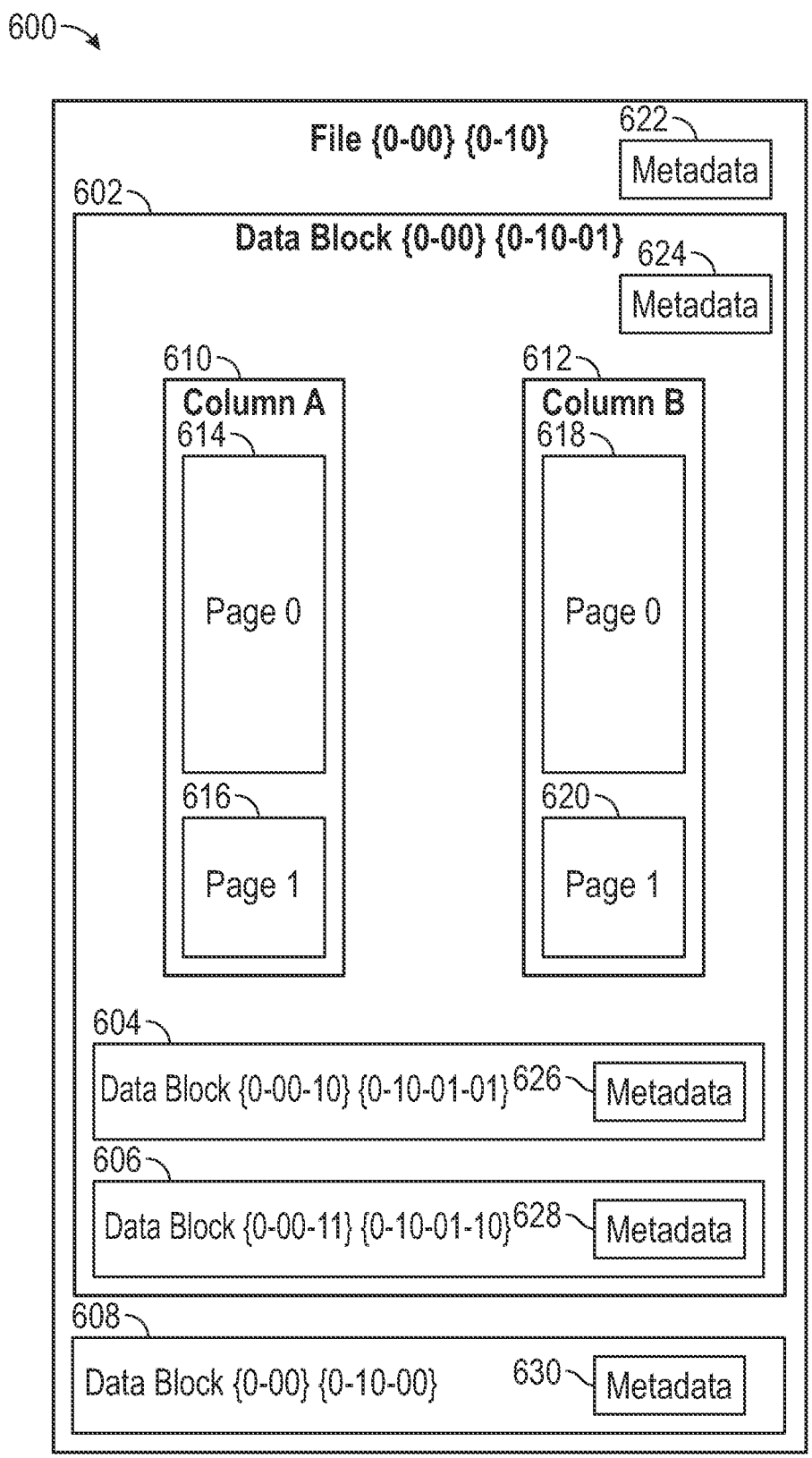
FIG. 6A shows information organized in data blocks of at least one file wherein the file and data blocks correspond to subdivisions of two different logical hierarchical data spaces according to various embodiments.

FIG. 6A shows a method of organizing information in at least one data block of at least one file wherein the file and data blocks correspond to subdivisions of two different logical hierarchical data spaces and preserve the hierarchy of each logical hierarchical data space. File 600 contains tuples with hierarchical path identifiers that correspond to subdivision {0-00}. These hierarchical path identifiers may be the same as subdivision {0-00} or be child subdivisions such as {0-00-10} or {0-00-10-01}. Since files correspond to a subdivision of at least one logical hierarchical data space, it can be quickly determined for an operation on a hierarchical data space which files apply. File 600 has two hierarchical path identifiers. That is because each file can correspond to one or more different logical hierarchical data spaces. By using multiple different logical hierarchical data spaces, the operations using hierarchical path identifiers can be performed more efficiently. This is because each hierarchical data space enhances the selectivity of the access or query. An operation with hierarchical path identifiers {0-00} {0-10-01} matches the file's hierarchical path identifiers in both hierarchical data spaces. However, an operation with HPId {0-00} {0-01} matches in just one hierarchical data space {0-00} and not {0-10}. Therefore, the file can be skipped because it does not contain any tuples relevant to the operation.

The subdivisions for a file are calculated by finding the deepest parent subdivision for all the data block subdivisions. File 600 {0-00} is calculated by finding the deepest parent subdivision of {0-00}, {0-00}, {0-00-10}, and {0-00-11}. Since the data blocks in FIG. 6A preserve hierarchy, only the top-level data blocks need to be used. In this case, {0-00} for both data block 602 and data block 608. The second subdivision for the file is found in the same way. {0-10} is determined by finding the deepest parent subdivision of {0-10-01} and {0-10-00}. {0} is a parent subdivision of both, but {0-10} is deeper in the hierarchy and a parent to both. Therefore file 600 has subdivisions {0-00} and {0-10}.

File 600 contains a data block 602 {0-00} {0-10-01}. The contents of data block 602 are stored before child data block 604 and child data block 606. This is called pre-order. The contents could also be stored in-order or post-order. The same probabilistic filtering on files provided by using multiple hierarchical data spaces also works on data blocks. For example, an operation with HPId {0-00} {0-10-00} matches both hierarchical path identifiers for the file but does not match for data block 602. Since data block 604 and data block 606 are subdivisions of data block 602, they are also excluded from being accessed. Unlike flat probabilistic data structures such as bloom filters that do not preserve either hierarchy or the path through a hierarchical data space, this method allows for very efficient arrangement of data within files for rapid access while minimizing input/output. {0-00}{0-10-00} does match data block 608 {0-00} {0-10-00} and it would be relevant to the operations With this method of organizing data in files using subdivisions of at least one logical hierarchical data space, information can be stored in data blocks in any of these formats. In fact, a file can be stored in a data block of another file. That file can be organized using logical hierarchical data spaces. This method supports a fully recursive model.

Data in any form can be stored in the data blocks. If the file and data blocks are organized using subdivisions of logical hierarchical data spaces, the data they contain can be efficiently accessed using hierarchical path identifiers and hierarchical probabilistic filtering.

Data block 602 is shown with data organized in subblocks labeled Column A and Column B. Subblock 610 contains page 614 and page 616. Subblock 612 contains page 618 and 620. By storing tuples in multiple subblocks, the values for an attribute from multiple tuples can be stored together. By storing the values for an attribute from multiple tuples together, the values may be more efficiently compressed than if all the values for all the attributes of a tuple are compressed together. In some circumstances an operation that only accesses a limited number of attributes can avoid IO. By dividing data blocks into subblocks, or pages, IO may be reduced. Pages are typically sized by the size of a block on the storage device to optimize IO. Pages can also be associated with subdivisions of logical hierarchical data spaces for the tuples that they contain. These associations could be stored with the pages or with metadata in the file or data block. That way the pages that need to be accessed can be filtered using hierarchical probabilistic filtering.

Figure 6B:
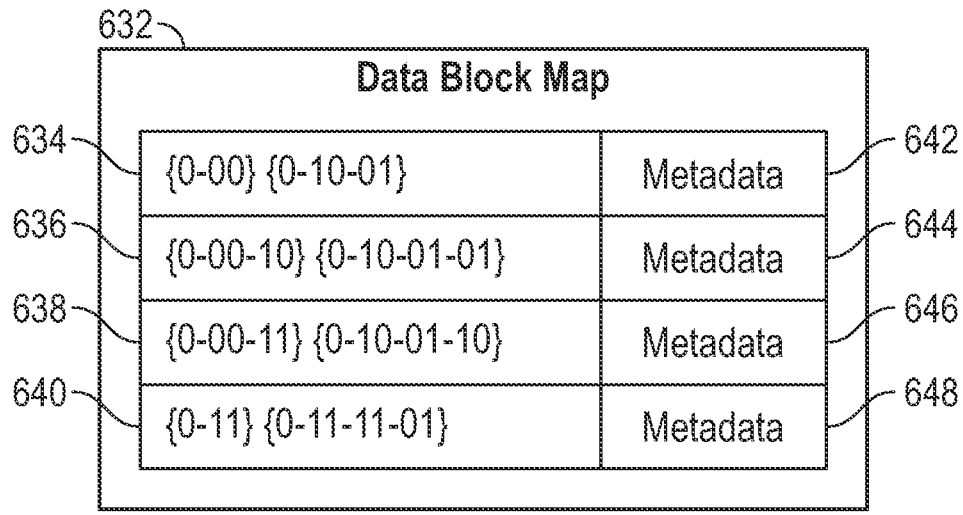
FIG. 6B shows a data block metadata map using hierarchical path identifiers according to various embodiments.

File 600 contains metadata 622. File metadata may include a data block map 638 as shown in FIG. 6B. File metadata may include the location of each data block in the file. File metadata may include a timestamp when the file was created or a time interval covering the tuples in the file. The file metadata may also include hierarchical path identifiers for different attributes contained in the file so that the contents of the file may be probabilistically filtered by these attributes. For instance, each tuple may correspond to a time interval or a timestamp. A time interval covering all tuples could be calculated. One or more hierarchical path identifiers could be generated for one or more hierarchical data spaces using the time interval value and stored in the file metadata. File metadata may also include statistics about the contents of the data blocks, subblocks, or pages. Statistics may include, but are not limited to, the size of the tuples, the age of the tuples, average size of the tuples, median size of the tuples, whether the tuples have been encrypted, whether the tuples have been compressed, the compressed size of the tuples, and compression ratio of the tuples. Statistics for each data block may be aggregated and stored in their parent data block or in the file.

Data block 602 contains metadata 624. Data block 604 contains metadata 626. Data block 606 contains metadata 628. Data block 608 contains metadata 630. The data block metadata may also include, but is not limited to, the location of the data block in the file, the size of the data block, the format of the data block, the location of any child data blocks, the location of any subblocks, the location of any pages, the size of any child data blocks, the size of any subblocks, the size of any pages, the attribute associated with each subblock, the attribute or attributes associated with each page, a timestamp, or the compression used to compress the contents of the data block.

FIG. 6B shows a method of organizing a data block metadata map using hierarchical path identifiers. This map holds the metadata for each data block. This metadata may include the location in the file for the data block and the size of the data block in bytes. Files, data blocks, and pages can be filtered using probabilistic spatial filtering to avoid serializing and evaluating unnecessary tuples. Files, data blocks, or pages that contain data for a given operation with hierarchical path identifiers can be found if there is a map from a subdivision in a hierarchical data space to a file and a data block, subblock, or page in a file. Data blocks, subblocks, and pages can be identified and located by their offset and size within the file. In some embodiments, size may be able to be implied from other known information such as the offsets of each data block. When the data blocks are in a flat form, size can be derived from the offsets. If the data blocks are stored inside other data blocks, the size is included in the map.

Data block map 632 shows the map of the data blocks contained by file 600. Data block 634 with subdivisions {0-00} {0-10-01} maps to metadata 642. Metadata 642 may be the same metadata as that stored in the file as metadata 624, or it may be a subset. Metadata 642 indicates the position of the data block and optionally the size of the data block in the file 600. It may also include statistics about the contents of the data block and any child data blocks, subblocks, or pages. Data block 636 has metadata 644. Data block 638 has metadata 646. Data block 640 has metadata 648. FIG. 6B shows a flat arrangement for the metadata. The metadata map can be arranged in a variety of data structures such as a hash map. In at least one embodiment, the data block metadata map will be kept using a physical hierarchical data space to preserve the hierarchy of the data blocks and speed up operations in the map.

An operation corresponding to subdivisions {0-00} {0-10-01} can find data block 634 in the map and go directly to the offset in data block metadata 642 and access the data stored at that location. This allows the operation to minimize how much of the file is loaded and how much of the data in the file is evaluated for the operation.

In at least one embodiment, file metadata offsets are the actual position within the file. In another embodiment, they could be an identifier that maps to the actual position within the file.

Files can store the map in their metadata so that a file reader can load the map and find a given data block, subblock, or page without scanning the entire file. However, these maps cannot be loaded without also accessing at least a part of the file. FIG. 2 shows a system with a registrar containing a set of files and the parent subdivision for all the data it contains. By storing the map in a registrar with the file and based on the files hierarchical path identifier, it can be determined if a data block, subblock, or page contains any data relevant to a given operation or query without having to loading and read the file. If it is determined that a data block, subblock, or page contains data relevant to a given operation, the specific bytes for the data block, subblock, or page may be directly accessed if the storage system supports accessing a subset of the file.

A challenge with this approach is that a hierarchical data space could contain billions of subdivisions. If a data set is large enough and sufficiently distributed over those subdivisions, the registry kept by the registrar service and each entry in the registry could become extremely large. For instance, a petabyte data set could contain one million 1 GB files. Each of those 1 GB files could contain millions of data blocks. A registrar for this data set could contain one million file entries and each containing maps with a million entries. Finding the files and data blocks containing data relevant to the operation could be an expensive operation.

The registrar in FIG. 2 shows the files being organized using a physical hierarchical data space. This allows for very efficient search for files that are relevant to a given query since the files are registered by their hierarchical path identifiers and searching the registrar uses the hierarchical path identifiers of the operation to find the matching files. Once the files are found, the entries for each file can be loaded and the map of data block metadata can be searched to find if any data block contains data relevant to the query. This map is also organized by hierarchical path identifier. Therefore, it can also be stored in a physical hierarchical data space for rapid search. The map may also be stored in a flat form such as a list or a map. However, it may be less efficient to search in the map in these forms than if the map is stored in a form that preserves the hierarchy of the corresponding hierarchical data space(s).

Figure 6C:
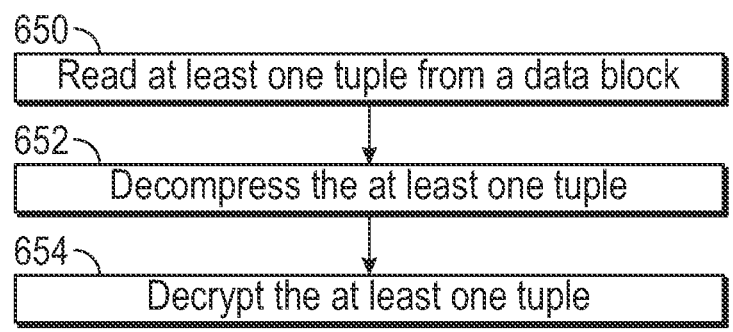
FIG. 6C shows a method of reading a tuple from a data block according to various embodiments.

FIG. 6C shows a method of reading a tuple from a data block. Step 650 will read at least one tuple from a data block. If the tuple is compressed, step 652 may decompress the at least one tuple. If the tuple is encrypted, step 654 may decrypt the at least one tuple.

Figure 6D:
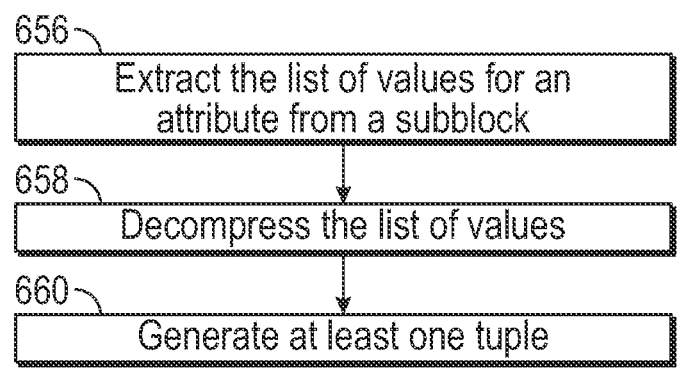
FIG. 6D shows a method of reading a tuple that has been shredded into one or more values stored in separate subblocks of a data block according to various embodiments.

FIG. 6D shows a method of reading a tuple from a file by extracting a list of values from one or more subblocks and then taking corresponding values from the list or lists and using them to generate one or more tuples. The list of values may be compressed and therefore need to be decompressed before extracting a value to include in the tuple being read. a subblock and shredding a tuple into at least one column of values, compressing the column of values, and writing the column of values to a subblock of a data block. Data block 602 of FIG. 6A contains subblocks 610 and 612, each containing the values for different attributes for a set of tuples. Step 656 extracts the list of values for an attribute from a subblock such as subblock 610. If the list is split into multiple pages, then step 658 will extract the list of values from pages 614 and page 616. Step 658 decompresses those values using an appropriate compression technique. The information required to decompress the list of values may be stored in the metadata for the subblock or determined based on the datatype of the attribute. Step 660 will generate a tuple by extracting the correct value from the list and setting it in the tuple. This will happen for every attribute stored as a separate list of values. If the values are encrypted, they may be decrypted.

Figure 7A:
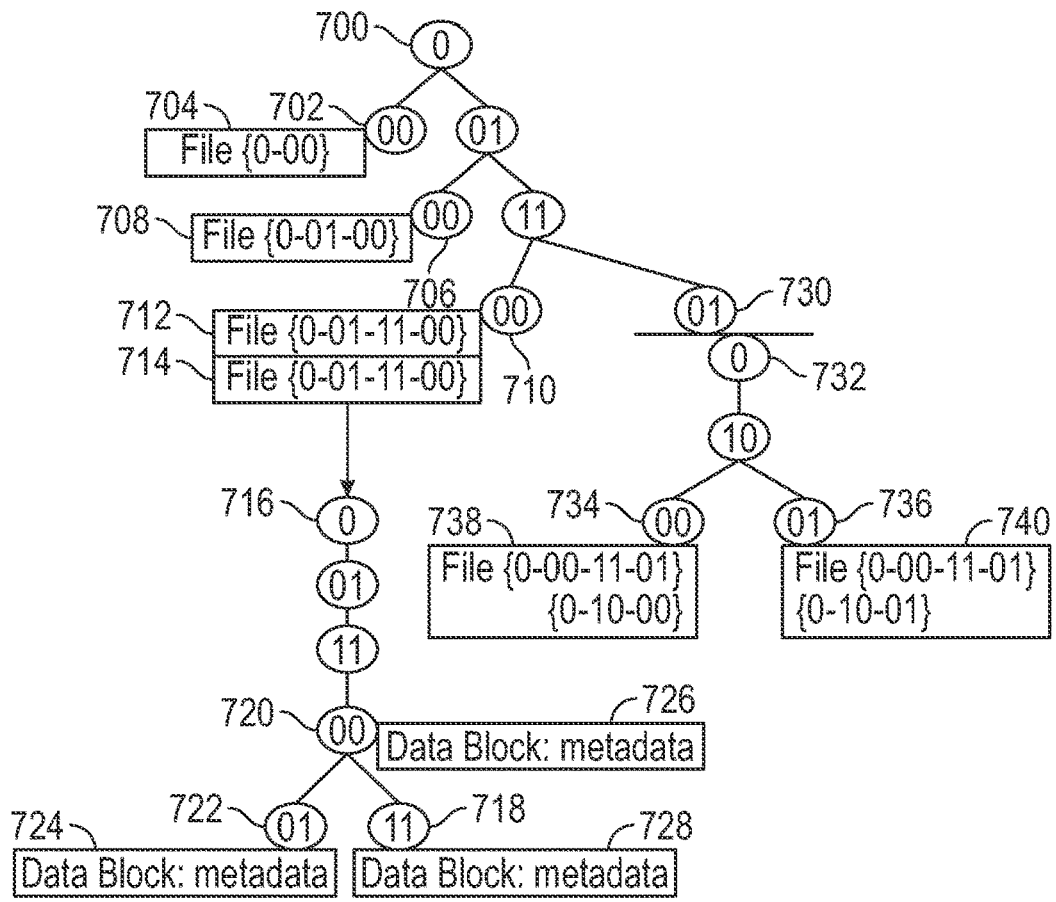
FIG. 7A shows file metadata and data block metadata stored according to their corresponding subdivisions of logical hierarchical data spaces according to various embodiments.

FIG. 7A shows a method for registering files and the maps of data block offsets using physical hierarchical data spaces. Physical hierarchical data space 700 contains a set of subdivisions. Each subdivision such as 702 can hold a file registration for a file or data block that contains information for the corresponding subdivision or children of the corresponding subdivision. Subdivision 702 contains file registration 704 {0-00}. Subdivision 706 contains file registration 708 {0-01-00}. Subdivision 702 contains file registration 712 and file registration 714. A subdivision can hold any number of files or data block registrations. For example, subdivision 710 contains file registration 712 and file registration 714. File registration 714 contains a physical hierarchical data space 716 that contains all the data block offsets arranged by hierarchical path identifier. For example, data block 726 {0-01-11-00} is stored in the physical hierarchical data space 716 at subdivision 720. Data block 724 {0-01-11-00-01} is stored in subdivision 722. An operation that matches subdivision {0-01-11-00-01} can quickly find the data block offset 724 and go directly to the file and that data block of the file. A bounding query operation that matches subdivision 720 {0-01-11-00} could access data block 726, data block 724, and data block 728 to find candidate tuples for the query operation. The bounding query operation could avoid accessing file 704, file 708 or any of the files under subdivision 730 since they are not subdivisions relevant to query {0-01-11-00}. The rules for which subdivisions are relevant vary based on the operation. Bounding queries have different rules for which subdivisions are accessed than intersection queries. Equality operations access specific subdivisions.

If there are many files in a subdivision, a set of nodes can be attached to the subdivision and the files organized by its HPId for a second hierarchical data space. This enables the ability to efficiently query large numbers of files and data blocks to find the ones that are relevant to an operation such as a query. For example, the file registrations for subdivision 730 are split into a second set of nodes or tree with root node 732 corresponding to a second logical hierarchical data space. This second hierarchical data space has different subdivisions than the first LHDS of physical hierarchical data space 700. Subdivision 734 contains a file registration with a first HPId {0-00-11-01} and a second HPId {0-10-00}. Subdivision 736 contains a file registration 740 with a first HPId {0-00-11-01} and a second HPId {0-10-00}. Note that the first HPId for both file registrations are the same, {0-00-11-01}. However, they have different hierarchical path identifiers for the second hierarchical data space. An operation with a first HPId {0-00-11-01} would have to consider both file registrations but an operation with second HPId {0-10-01} would just consider file registration 738.

By storing the data blocks in a way that preserves the hierarchy of their corresponding hierarchical data space, a map can be registered that contains a limited number of subdivisions. The child subdivisions are pruned to limit the size of the map. Since data blocks can preserve hierarchy, a parent subdivision can remain in the map while its child subdivisions are pruned. The registrar can identify any files and their data blocks that may contain a match for the HPId for the operation. However, the match may identify the parent subdivision since the child subdivision may have been pruned. In this case, the data block for the parent is accessed and then its child data blocks are searched for any data blocks that match. Because the child subdivisions have been pruned, the operation cannot go directly to the child data block containing the data. Instead, it may need to be accessed through its parent data block. This trades efficiency as much of the parent data block may not be germane to the query. However, this effectively trades query efficiency against the size of the map metadata stored by the registrar. Preserving the hierarchy of a hierarchical data space in the file and using physical hierarchical data spaces to organize the file entries and maps in the registrar provide a much more efficient way to find and access relevant data for a given operation than using a flat model. Using multiple different hierarchical data spaces to organize the data in the files increases the selectivity of the searches and filtering of relevant files, data blocks, subblocks, and pages.

An alternative embodiment to keeping a full subdivision to data block metadata map is to find the files in the registry that contains a parent subdivision relevant to the operation. Then, the file metadata map can be loaded from the file to determine if any data blocks are present that apply to the operation. This allows the map stored in the registry to be pruned yet input/output can still be minimized. However, access is not as efficient as having the full metadata map in the registry or preserving hierarchy in the data blocks as an extra input/output is required to load the full map from the file itself.

Figure 7B:
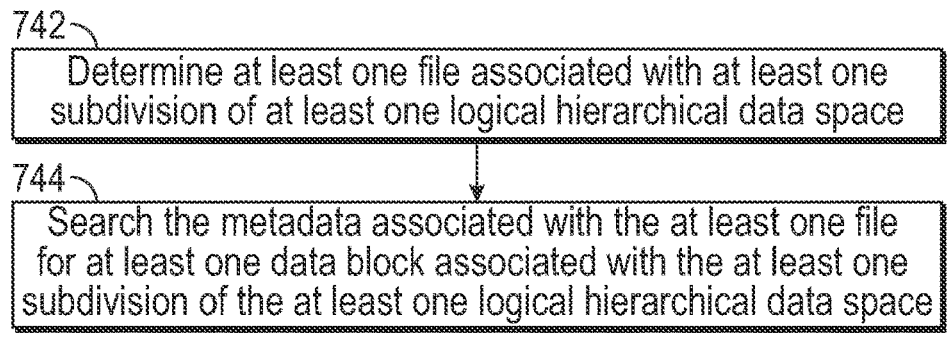
FIG. 7B shows a method for determining at least one data block associated with at least one subdivision of the at least one hierarchical data space according to various embodiments.

FIG. 7B shows a method for determining at least one data block associated with at least one subdivision of the at least one hierarchical data space. Step 742 determines at least one file associated with at least one subdivision of at least one logical hierarchical data space. Step 744 searches the metadata associated with the at least one file for at least one data block associated with the at least one subdivision of the at least one logical hierarchical data space. For example, a data operation has at least one subdivision with a HPId of {0-00}. Step 742 would look at physical hierarchical data space 700 and find subdivision 702 corresponds with {0-00}. File registration 704 is stored in subdivision 702. Step 744 could extract the metadata stored in file registration 704 to find at least one data block that has a corresponding subdivision of {0-00}. In another example, a data operation may have a subdivision of {0-01-11-00-11}. Subdivision 710 matches and contains file registration 712 and file registration 714. File registration 712 and 714 will be searched by step 744 to find a matching data block. File registration 714 has metadata that is organized using hierarchical data space 716. That metadata contains the data block registrations and metadata. Subdivision 720 has data block registration and metadata 726. Subdivision 722 contains data block registration and metadata 724. Subdivision 718 contains data block registration and metadata 728. Data block registration and metadata 728 matches the desired subdivision {0-01-11-00-11}. For certain data operations, data block registration and metadata 726 may also match since subdivision {0-01-11-00} is a parent of subdivision {0-01-11-00-11}.

Figure 7C:
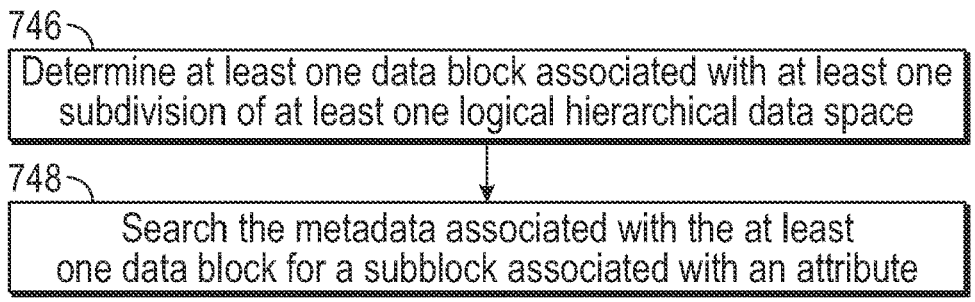
FIG. 7C shows a method for determining at least one subblock associated with at least one subdivision of the at least one hierarchical data space according to various embodiments.

FIG. 7C shows a method for determining at least one subblock associated with at least one subdivision of the at least one hierarchical data. Step 746 would determine the data blocks that correspond to the at least one subdivision. For example, a data operation has two subdivisions for two different logical hierarchical data spaces with a HPId of {0-01-11-01} {0-10-01}. Subdivision 730 contains the file registrations that correspond to {0-01-11-01}. File registration 738 and file registration 740 are stored under a second LHDS 732 that is attached to subdivision 730. File registration 738 with HPId {0-00-11-01} {0-11-00} does not match both HPIds for the data operation. File registration 740 with HPId {9-00-11-01} {0-10-01} does match both HPIds for the data operation. Step 746 will use the file registration 740 to determine at least one data block associated with both subdivisions of the two different logical hierarchical data spaces. Step 748 will search the metadata associated with the data block to determine the subblocks that are associated with an attribute specified for the data operation.

Figure 8A:
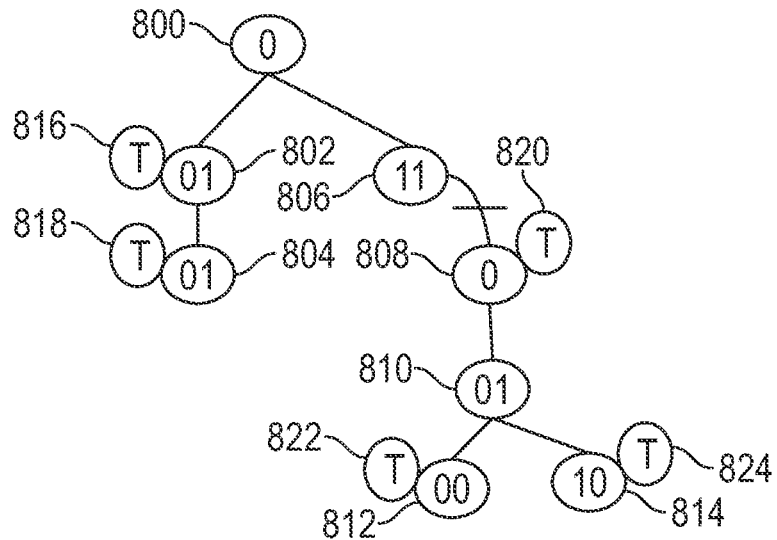
FIG. 8A shows the tuples of a first file organized using a physical hierarchical data space with multiple logical hierarchical data spaces.
Figure 8B:
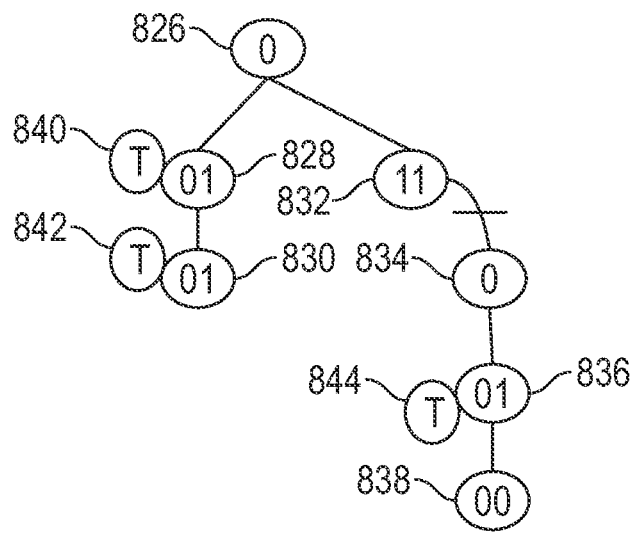
FIG. 8B shows the tuples of a second file organized using a physical hierarchical data space with multiple logical hierarchical data spaces.

FIG. 8A shows the tuples of a first file organized using a physical hierarchical data space with multiple logical hierarchical data spaces. FIG. 8B shows the tuples of a second file organized using a physical hierarchical data space with multiple logical hierarchical data spaces.

Figure 8C:
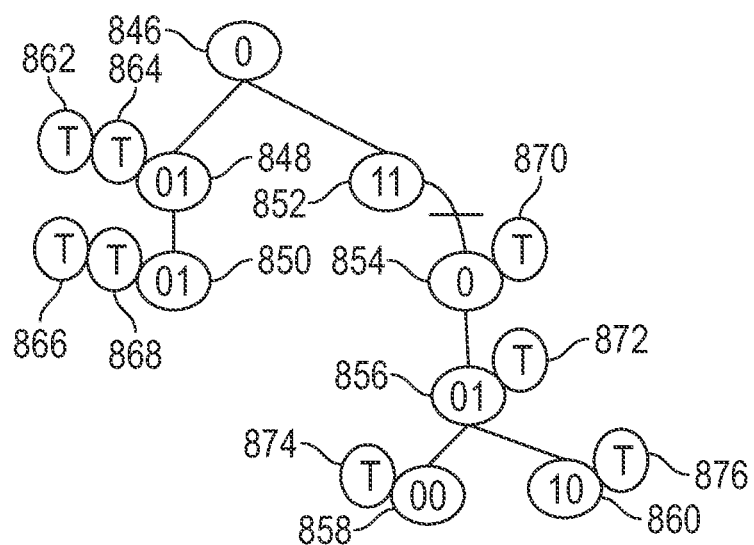
FIG. 8C shows the results of merging the corresponding subdivisions of a first file and a second file into a third file organized using hierarchical data spaces according to various embodiments.

FIG. 8C shows the results of merging the corresponding subdivisions of a first file and a second file into a third file organized using hierarchical data spaces. To perform this merge data operation, the physical hierarchical data spaces and their associated logical hierarchical data spaces were chosen. The subdivisions were determined by coordinated traversal of the hierarchical data spaces. The tuples were read from the subdivisions of each physical hierarchical data space, which also correspond to the subdivisions of the logical hierarchical data spaces. These subdivisions also correspond to the data blocks of a file. The tuples from each physical hierarchical data space were written into the new hierarchical data space.

Subdivision 800 and subdivision 826 contain no tuples, so subdivision 846 will have no data. 802 has a tuple 816 and subdivision 828 has a tuple 840. Therefore, subdivision 848 will have two tuples, tuple 862 and tuple 864. The merge process may determine that they are the same tuple, or that one tuple is a mutation of the other tuple, keeping only one. Subdivision 804 has a tuple 818 and subdivision 830 has a tuple 842. Therefore, subdivision 850 will have tuple 866 and tuple 868. Subdivision 806 and subdivision 832 have no tuples so subdivision 852 will have no candidates. Subdivision 806 has no tuples but does have a connected second hierarchical data space. Subdivision 808 has a tuple 820 while subdivision 834 has no tuples. Therefore, subdivision 854 will have a single tuple 870. Subdivision 810 has no tuples but subdivision 836 has a tuple. Subdivision 812 contains tuple 822 and there are no tuples in subdivision 838, so tuple 874 is stored in subdivision 858. Subdivision 814 has a tuple 824 but there is no corresponding subdivision in the secondary hierarchical data spaces. Subdivision 814 is not a common subdivision between FIG. 8A and FIG. 8B. Tuple 876 will be stored in subdivision 860.

Figure 8D:
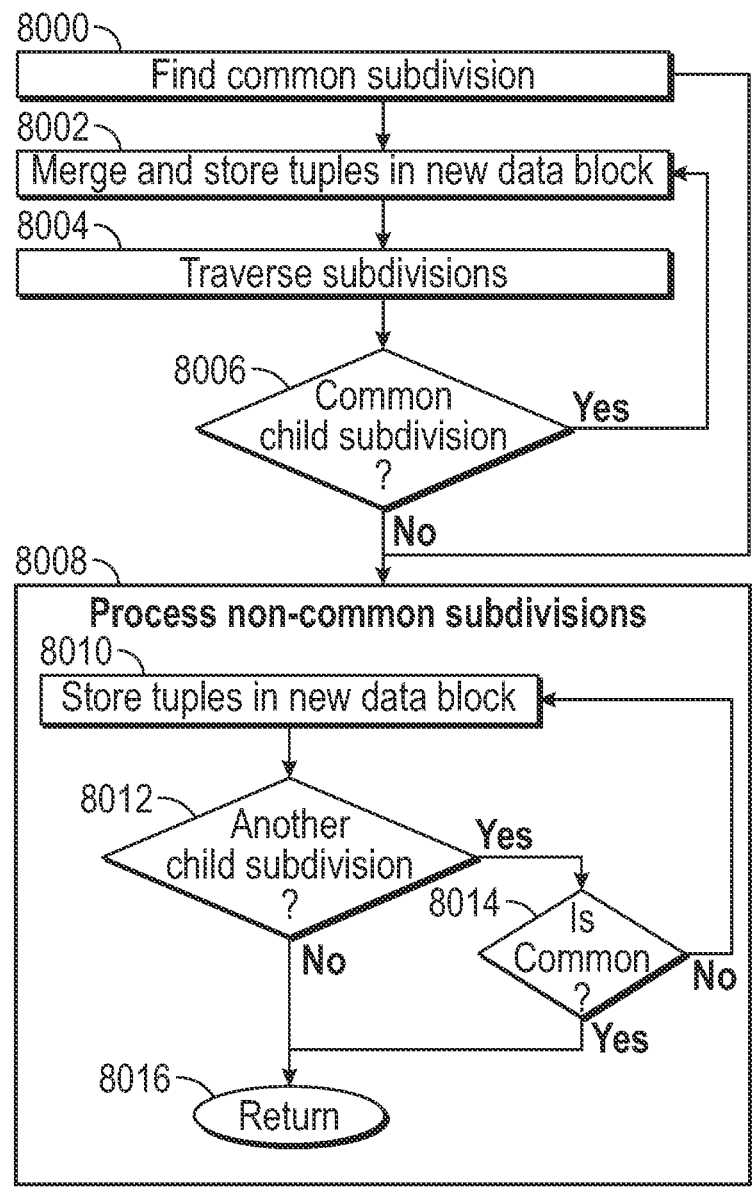
FIG. 8D shows a method of merging the corresponding subdivisions of a first file and a second file into a third file organized using hierarchical data spaces according to various embodiments.

FIG. 8D shows a method of merging the corresponding subdivisions of a first file and a second file into a third file organized using hierarchical data spaces using coordinated traversal of subdivisions. The files must share the same logical hierarchical data spaces. The method is easily extended to multiple files. The logical hierarchical data spaces for the files will be chosen for the process. The subdivisions will be determined by coordinated traversal of the subdivisions present in the file chosen as the driving file.

The process starts by finding a common subdivision 8000. Any non-common subdivisions for the at least one LHDS are processed by the method of 8008. The tuples for the non-common subdivisions are stored in a new data block in step 8010, which is then associated with the subdivision. Step 8012 will iterate through any child subdivisions and if there are any, check if the subdivision is common in step 8014. If not, the subdivision will be processed by the operations in step 8010. This is a recursive approach to processing the subdivisions. If there are no more child subdivisions or a common subdivision is found, then the process will return to the main process via the return step in 8016. The step to check if a subdivision is common is only there for the initial find common subdivision. Once a non-common subdivision is found afterward, it will not find any common subdivisions among its child subdivisions. Otherwise, step 8014 will determine if a common subdivision has been found. If not, the process will go to step 8010 to store the tuples for the child subdivision. If it is common, the process will return in step 8016.

Once a common subdivision is found, the merge operation, step 8002 will merge the tuples from the common subdivisions of the first file and the second file. In some cases, the tuples may be duplicates and need to be deduplicated. In some cases, a tuple in a newer file may be a mutation that changes the values of an older tuple. The merge process may adjudicate this and store only the latest tuple. After 8002 stores the tuples in a new data block corresponding to the subdivision, the child subdivisions will be traversed by step 8004. Step 8006 will check each child subdivision to see if they are common. If not, process non-common subdivisions will be called. If a subdivision is common, step 8002 will be repeated for that subdivision. Step 8002 and step 8004 can be performed in different orders to pre-order or post-order processing. Step 8002 and step 8004 can be combined for in-order processing.

Figure 9A:
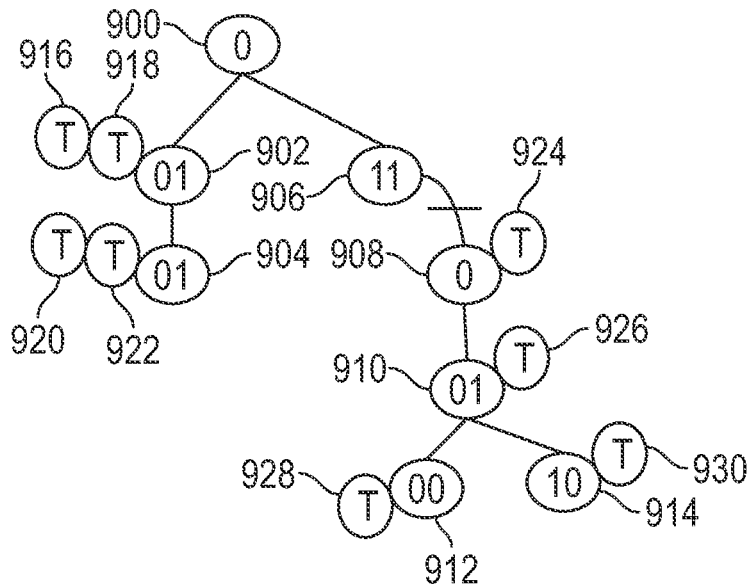
FIG. 9A shows the tuples of a first file organized using a physical hierarchical data space with multiple logical hierarchical data spaces according to various embodiments.

FIG. 9A shows the tuples of a first file organized using a physical hierarchical data space with multiple logical hierarchical data spaces. The subdivisions correspond to data blocks of the first file.

Figure 9B:
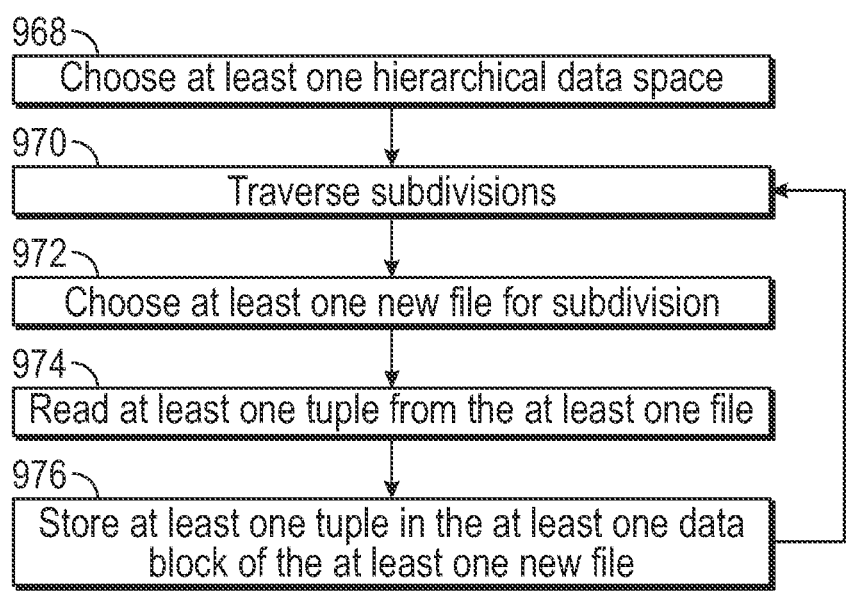
FIG. 9B shows a method of splitting a file organized using hierarchical data spaces into multiple files at a specified subdivision according to various embodiments.

FIG. 9B shows a method of splitting a file organized using hierarchical data spaces into multiple files at a specified subdivision. First, at least one hierarchical data space is chosen by step 968. For merging files, the hierarchical data spaces are those logical hierarchical data spaces associated with the file. This association could be stored in the file, in the name or path of the file, in a companion file, or stored in a registrar. The file will be organized using a physical hierarchical data space that associates data blocks with the subdivisions of the logical hierarchical data spaces. Step 970 will begin traversing the subdivisions of the hierarchical data space. Step 972 will determine which new file the data for the subdivision should be written to. It may be that a file is being split into two new files at a given subdivision. Before this subdivision is reached, the contents of the subdivisions that are traversed will be written to a specified new file. Once the split subdivision is reached, then its contents and its child subdivisions can be written to the other new file. This can be extended to multiple new files by mapping the subdivisions that are associated with each new file.

Step 974 will read at least one tuple from the at least one file. The at least one tuple will be read from the data block that corresponds to the subdivision. If no data is present in the data block, the tuple read will effectively be null. If a null value is read, then the subdivision may not need to be written in the new file. However, it may be written with no tuples if it has child subdivisions that do contain tuples. Step 976 will store the tuples in at least one data block of the at least one new file.

Figure 9C:
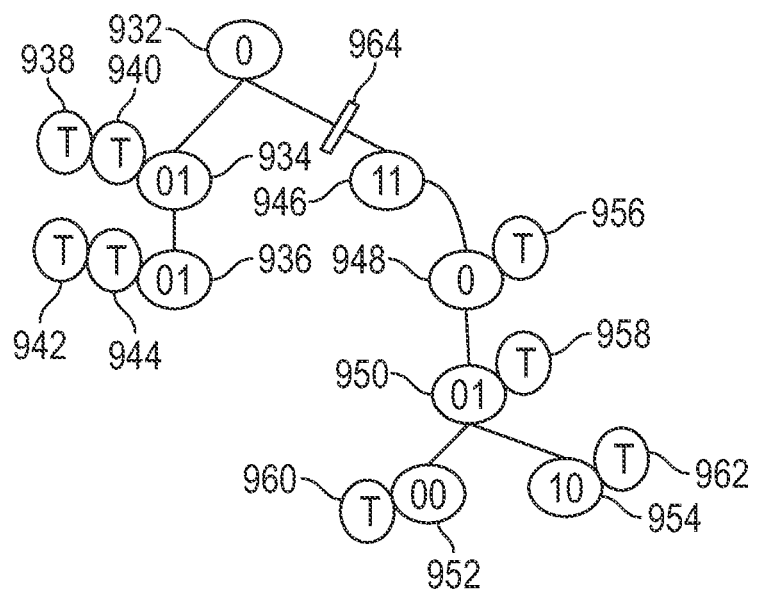
FIG. 9C shows the results of splitting a file at a specified subdivision into a first new file and a second new file according to various embodiments.

FIG. 9C shows the results of splitting a file at a specified subdivision into a first new file and a second new file. The subdivisions correspond to data blocks of the first new file and a second new file. The split will occur between subdivision 932 and subdivision 946, as shown by split 964. The subdivisions of FIG. 9A are traversed. Subdivisions that are visited before subdivision 946 is visited will be stored in the first new file. Subdivision 946 and its child subdivisions will be stored in the second new file. Subdivision 900 has no tuples. Subdivision 932 is written to the first new file. Subdivision 902 has two tuples, tuple 916 and tuple 918. They will be written to a data block of the first new file corresponding to subdivision 902. Subdivision 904 will be visited next. It has two tuples, tuple 920 and tuple 922. They will be written to a data block of the first new file corresponding to subdivision 904. This is a depth-first traversal. Next, subdivision 906 will be visited. Since subdivision 906 is the split subdivision, it will be written to the second new file. Its subdivisions will be traversed and written to the second new file as well. Subdivision 908 has tuple 924, which will be written to subdivision 948 as tuple 956. Subdivision 910 has tuple 926, which will be written to subdivision 950 as tuple 958. Subdivision 912 has tuple 928, which will be written to subdivision 952 as tuple 960. Subdivision 914 has tuple 930, which will be written to subdivision 954 as tuple 962.

Figure 10:
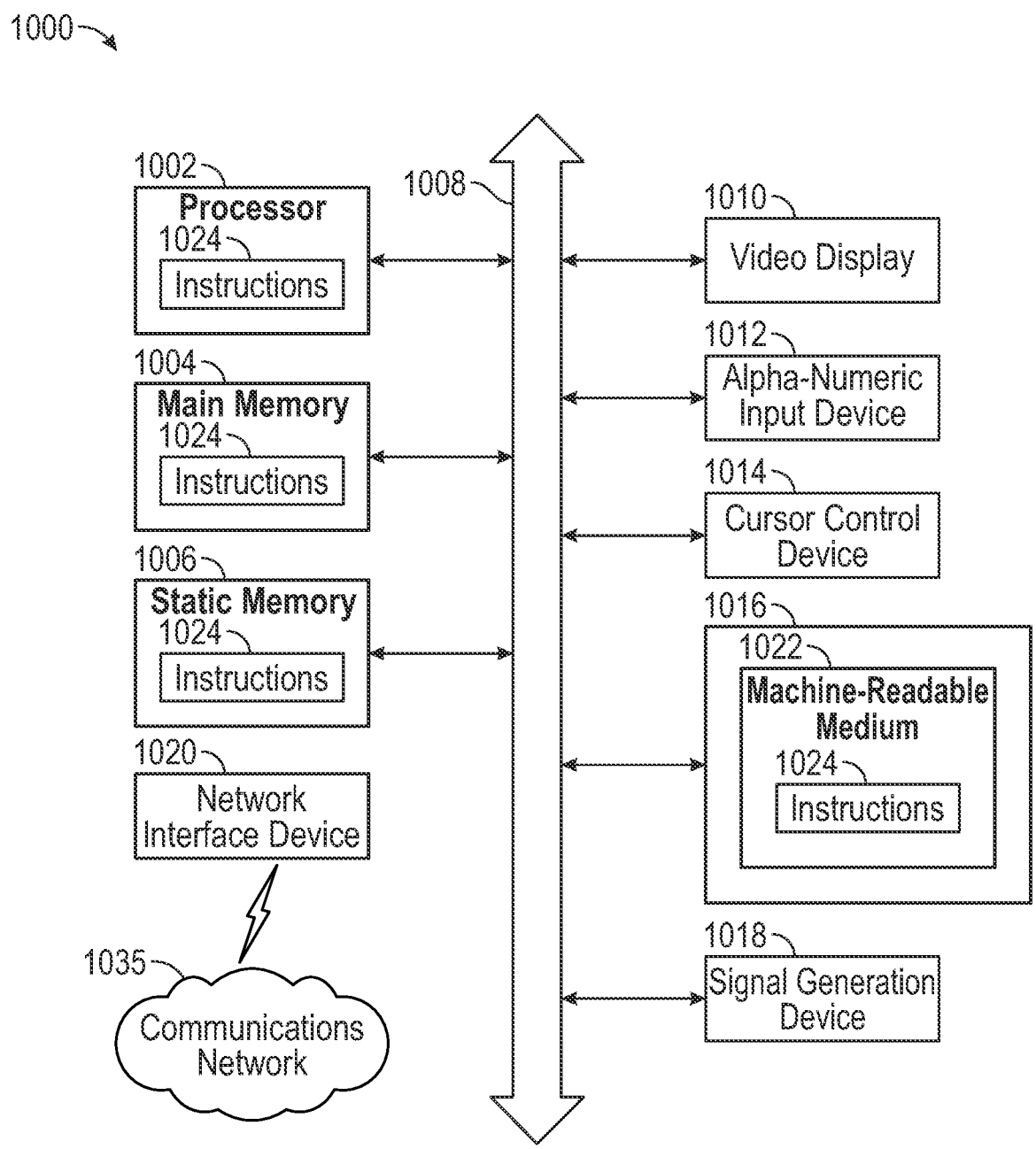
FIG. 10 is a schematic diagram of a machine in the form of a computer system within which a set of instructions, when executed, may cause the machine to perform any one or more of the methodologies or operations of the systems and methods for organizing information.

Referring now also to FIG. 10, at least a portion of the methodologies and techniques described with respect to the exemplary embodiments of the methods and systems described herein (e.g., the method and system depicted in FIG. 1C/FIG. 2A) can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system FIG. 1C/FIG. 2A. For example, the machine may be configured to, but is not limited to, assist the system FIG. 1C/FIG. 2A by providing processing power to assist with processing loads experienced in the system FIG. 1C/FIG. 2A, by providing storage capacity for storing instructions or data traversing the system FIG. 1C/FIG. 2A, or by assisting with any other operations conducted by or within the system FIG. 1C/FIG. 2A.

In some embodiments, the machine may operate as a standalone device. In some embodiments, the machine may be connected (e.g., using communications network 1035, another network, or a combination thereof) to and assist with operations performed by other machines and systems. The machine may be connected with any component in the system FIG. 1C/FIG. 2A. In a networked deployment, the machine may operate in the capacity of a server or a client, such as a client user machine, in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010, which may be, but is not limited to, a liquid crystal display (LCD), a flat panel, a solid-state display, or a cathode ray tube (CRT). The computer system 1000 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 1002, or a combination thereof, during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 1035, another network, or a combination thereof, can send or receive voice, video or data, and to communicate over the communications network 1035, another network, or a combination thereof, using the instructions. The instructions 1024 may further be transmitted or received over the communications network 1035, another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system for executing a data operation, the system comprising:
    a memory that stores instructions; and
    a processor that executes the instructions to perform operations, the operations comprising:
    determining at least one subdivision of first and second logical hierarchical data spaces, wherein each of the logical hierarchical data spaces includes a plurality of subdivisions;
    determining at least one file corresponding to the at least one subdivision of each of the first and the second logical hierarchical data spaces, wherein the at least one file comprises at least one data block, wherein the at least one data block corresponds to the subdivision of the respective first or second logical hierarchical data space;
    querying at least one registrar for the at least one file corresponding to the at least one subdivision of the first and second logical hierarchical data spaces; and
    reading at least one tuple from the at least one data block of the at least one file.

2. The system of claim 1, further comprising probabilistically evaluating the at least one tuple using the at least one subdivision of the at least one logical hierarchical data space.

3. The system of claim 1, wherein the determining at least one subdivision for each of the first and second logical hierarchical data spaces comprises determining at least one subdivision for each of a plurality of logical hierarchical data spaces.

4. The system of claim 1, wherein determining at least one subdivision of the first and second logical hierarchical spaces comprises:
    determining at least one value; and
    identifying at least one subdivision of the first and second logical hierarchical data space respectively that corresponds to the at least one value of the first or second logical hierarchical data space.

5. The system of claim 1, wherein determining the at least one subdivision of the first and second logical hierarchical data spaces comprises, respectively:
    choosing at least one attribute that corresponds to the first or second logical hierarchical data space;
    determining at least one value for the at least one attribute; and
    identifying at least one subdivision of the first or second logical hierarchical data space that corresponds to the at least one value.

6. The system of claim 1, wherein determining the at least one subdivision of the first or second logical hierarchical data space comprises using a hierarchical path identifier to identify the subdivision of the first or second logical hierarchical data space.

7. The system of claim 1, wherein determining at least one subdivision of the first or second logical hierarchical space comprises using an encrypted hierarchical path identifier to identify the at least one subdivision of the first or second logical hierarchical data space wherein the encrypted hierarchical path identifier preserves the hierarchy of the first or second logical hierarchical data space.

8. The system of claim 1, wherein determining the at least one subdivision of the first or second logical hierarchical data space comprises traversing at least one subdivision of the first or second logical hierarchical data space.

9. The system of claim 1, wherein determining the at least one subdivision of the first or second logical hierarchical data space comprises traversing at least one parent subdivision of a specified subdivision of the first or second logical hierarchical data space.

10. The system of claim 1, wherein determining the at least one subdivision of the first or second logical hierarchical data space comprises traversing at least one subdivision of at least one of a plurality of logical hierarchical data spaces.

11. The system of claim 1, wherein determining the at least one subdivision of the first or second logical hierarchical data space comprises extracting hierarchical path identifiers from a result set.

12. The system of claim 1, further comprising decrypting the at least one tuple.

13. The system of claim 1, further comprising decompressing the at least one tuple.

14. The system of claim 1, further comprising extracting at least one hierarchical path identifier from the at least one tuple from the at least one file.

15. The system of claim 1, wherein the at least one file comprises a first file and a second file, the system further comprising:
    creating the second file;
    determining at least one split subdivision of the at least one logical hierarchical data space; and
    determining using the at least one split subdivision which of the first file or the second file to write the at least one tuple.

16. The system of claim 1, wherein the at least one file includes a name, and wherein determining the at least one file corresponding to the at least one subdivision of the first or second logical hierarchical data space comprises extracting a hierarchical path identifier from the name of the at least one file.

17. The system of claim 1, wherein the at least one file includes a path, and wherein determining at least one file corresponding to the at least one subdivision of the first or second logical hierarchical data space comprises extracting a hierarchical path identifier from the path of the at least one file.

18. The system of claim 1, wherein determining at least one file corresponding to the at least one subdivision of the at least one logical hierarchical data space comprises determining if the at least one file corresponds to the at least one subdivision of the first or second hierarchical data space and may contain at least one tuple that matches at least one condition.

19. The system of claim 1, further comprising:
   determining whether the at least one tuple matches at least one condition; and
   reading the at least one tuple from the at least one data block of the at least one file.

20. The system of claim 1, wherein the at least one data block comprises at least one subblock, the system further comprising:
   choosing at least one attribute;
   determining the at least one subblock of the at least one data block corresponding to the at least one attribute; and
   reading the at least one tuple from the at least one subblock of the at least one data block.

21. A method for executing a data operation, the method comprising:
   choosing, by utilizing instructions from a memory that are executed by a processor, at least one logical hierarchical data space;
   determining at least one subdivision of a first and a second logical hierarchical data spaces, wherein each of the logical hierarchical data spaces includes a plurality of subdivisions;
   determining at least one file corresponding to the at least one subdivision of each of the first and second logical hierarchical data spaces, wherein the at least one file comprises at least one data block, wherein the at least one data block corresponds to the subdivision of the at least one respective first or second logical hierarchical data space; and
   querying at least one registrar for the at least one file corresponding to the at least one subdivision of the first and second logical hierarchical data spaces; and
   reading at least one tuple from the at least one data block of the at least one file.

22. The method of claim 21, further comprising probabilistically evaluating the at least one tuple using the at least one subdivision of the first or second logical hierarchical data space.

23. The method of claim 21, wherein a plurality of different logical hierarchical data spaces are chosen.

24. The method of claim 21, wherein determining at least one subdivision of the first or second logical hierarchical space comprises:
   determining at least one value;
   and identifying at least one subdivision of the first or second logical hierarchical data space that corresponds to the at least one value.

25. The method of claim 21, wherein determining the at least one subdivision of the first or second logical hierarchical data space comprises:
   choosing at least one attribute that corresponds to the first or second logical hierarchical data space;
   determining at least one value for the at least one attribute; and
   identifying at least one subdivision of the first or second logical hierarchical data space that corresponds to the at least one value.

26. The method of claim 21, wherein determining at least one subdivision of the first or second logical hierarchical data space comprises using a hierarchical path identifier that identifies the at least one subdivision of the first or second logical hierarchical data space.

27. The method of claim 21, wherein determining at least one subdivision of the first or second logical hierarchical space comprises using an encrypted hierarchical path identifier to identify the at least one subdivision of the at least one logical hierarchical data space wherein the encrypted hierarchical path identifier preserves the hierarchy of the first or second logical hierarchical data space.

28. The method of claim 21, wherein determining the at least one subdivision of the first or second logical hierarchical data space comprises traversing at least one subdivision of the first or second logical hierarchical data space.

29. The method of claim 21, wherein determining the at least one subdivision of the first or second logical hierarchical data space comprises traversing at least one parent subdivision of a specified subdivision of the first or second logical hierarchical data space.

30. The method of claim 21, wherein determining the at least one subdivision of the first or second logical hierarchical data space further comprises traversing at least one subdivision of at least one secondary a plurality of logical hierarchical data spaces.

31. The method of claim 21, wherein determining the at least one subdivision of the first or second logical hierarchical data space comprises extracting hierarchical path identifiers from a result set.

32. The method of claim 21, further comprising decrypting the at least one tuple.

33. The method of claim 21, further comprising decompressing the at least one tuple.

34. The method of claim 21, further comprising extracting at least one hierarchical path identifier from the at least one tuple from the at least one file.

35. The method of claim 21, wherein the at least one file comprises a first file and a second file, the method further comprising:
   creating the second file;
   determining at least one split subdivision of the at least one logical hierarchical data space; and
   determining using the at least one split subdivision which of the first file or the second file to write the at least one tuple.

36. The method of claim 21, wherein the at least one file includes a name, and wherein determining at least one file corresponding to the at least one subdivision of the first or second logical hierarchical data space comprises extracting a hierarchical path identifier from the name of the at least one file.

37. The method of claim 21, wherein the at least one file includes a path, and wherein determining at least one file corresponding to the at least one subdivision of the first or second logical hierarchical data space comprises extracting a hierarchical path identifier from the path of the at least one file.

38. The method of claim 21, wherein determining at least one file corresponding to the at least one subdivision of the first or second logical hierarchical data space comprises querying at least one registrar for at least one file corresponding to the at least one subdivision of the first or second logical hierarchical data space.

39. The method of claim 21, wherein determining at least one file corresponding to the at least one subdivision of the first or second logical hierarchical data space comprises determining if the at least one file corresponds to the at least one subdivision of the first or second logical hierarchical data space and may contain at least one tuple that matches at least one condition.

40. The method of claim 21 further comprising:
determining at least one data block of the at least one file that corresponds to the at least one subdivision of the first or second logical hierarchical data space and may contain at least one tuple that matches at least one condition; and
reading the at least one tuple from the at least one data block of the at least one file.

41. The method of claim 21, wherein the at least one data block comprises at least one subblock, the method further comprising:
choosing at least one attribute;
determining the at least one subblock of the at least one data block corresponding to the at least one attribute; and
reading the at least one tuple from the at least one subblock of the at least one data block.

42. A computer readable device including instructions, which when loaded and executed by a processor, causes the processor to perform operations for organizing information comprising:
determining at least one subdivision of first and second logical hierarchical data spaces, wherein each of the at least one logical hierarchical data spaces includes a plurality of subdivisions;
determining at least one file corresponding to the at least one subdivision of the each of the first and the second logical hierarchical data spaces, wherein the at least one file comprises at least one data block, wherein the at least one data block corresponds to the subdivision of the first or second logical hierarchical data space; and
querying at least one registrar for the at least one file corresponding to the at least one subdivision of the at least one of the two different logical hierarchical data spaces; and
reading at least one tuple from the at least one data block of the at least one file.

43. The computer readable device of claim 42, further comprising probabilistically evaluating the at least one tuple using the at least one subdivision of the first or second logical hierarchical data space.

44. The computer readable device of claim 42, wherein a plurality of different logical hierarchical data spaces are chosen.

45. The computer readable device of claim 42, wherein determining at least one subdivision of the first or second logical hierarchical space comprises:
determining at least one value; and
identifying at least one subdivision of the first or second logical hierarchical data space that corresponds to the at least one value.

46. The computer readable device of claim 42, wherein determining the at least one subdivision of the first or second logical hierarchical data space comprises:
choosing at least one attribute that corresponds to the first or second logical hierarchical data space;
determining at least one value for the at least one attribute; and
identifying at least one subdivision of the first or second logical hierarchical data space that corresponds to the at least one value.

47. The computer readable device of claim 42, wherein determining at least one subdivision of the first or second logical hierarchical data space comprises using a hierarchical path identifier that identifies the at least one subdivision of the first or second logical hierarchical data space.

48. The computer readable device of claim 42, wherein determining at least one subdivision of the first or second logical hierarchical space comprises using an encrypted hierarchical path identifier to identify the at least one subdivision of the first or second logical hierarchical data space wherein the encrypted hierarchical path identifier preserves the hierarchy of the at least one logical hierarchical data space.

49. The computer readable device of claim 42, wherein determining the at least one subdivision of the first or second logical hierarchical data space comprises traversing at least one subdivision of the first or second logical hierarchical data space.

50. The computer readable device of claim 42, wherein determining the at least one subdivision of the first or second logical hierarchical data space comprises traversing at least one parent subdivision of a specified subdivision of the at least one logical hierarchical data space.

51. The computer readable device of claim 42, wherein determining the at least one subdivision of the first or second logical hierarchical data space comprises traversing at least one subdivision of at least one secondary logical hierarchical data space.

52. The computer readable device of claim 42, wherein determining the at least one subdivision of the first or second logical hierarchical data space comprises extracting hierarchical path identifiers from a result set.

53. The computer readable device of claim 42, further comprising decrypting the at least one tuple.

54. The computer readable device of claim 42, further comprising decompressing the at least one tuple.

55. The computer readable device of claim 42, further comprising extracting at least one hierarchical path identifier from the at least one tuple from the at least one file.

56. The computer readable device of claim 42, wherein the at least one file comprises a first file and a second file, the processor performing operations further comprising:
creating the second file;
determining at least one split subdivision of the at least one logical hierarchical data space; and
determining using the at least one split subdivision which of the first file or the second file to write the at least one tuple.

57. The computer readable device of claim 42, wherein the at least one file includes a name, and wherein determining at least one file corresponding to the at least one subdivision of the first or second logical hierarchical data space comprises extracting a hierarchical path identifier from the name of the at least one file.

58. The computer readable device of claim 42, wherein the at least one file includes a path, and wherein determining at least one file corresponding to the at least one subdivision of the first or second logical hierarchical data space comprises extracting a hierarchical path identifier from the path of the at least one file.

59. The computer readable device of claim 42, wherein determining at least one file corresponding to the at least one subdivision of the first or second logical hierarchical data space comprises querying at least one registrar for at least one file corresponding to the at least one subdivision of the first or second logical hierarchical data space.

60. The computer readable device of claim 42, wherein determining at least one file corresponding to the at least one subdivision of the first or second logical hierarchical data space comprises determining if the at least one file corresponds to the at least one subdivision of the first or second logical hierarchical data space and may contain at least one tuple that matches at least one condition.

61. The computer readable device of claim 42, further comprising:
- determining whether the at least one tuple that matches at least one condition; and
- reading the at least one tuple from the at least one data block of the at least one file.

62. The computer readable device of claim 42, wherein the at least one data block comprises at least one subblock, the processor performing operations further comprising:
- choosing at least one attribute;
- determining the at least one subblock of the at least one data block corresponding to the at least one attribute; and
- reading the at least one tuple from the at least one subblock of the at least one data block.

* * * * *